(12) United States Patent
Astle et al.

(10) Patent No.: US 7,638,042 B2
(45) Date of Patent: Dec. 29, 2009

(54) SYSTEM FOR MONITORING THE PERFORMANCE OF FLUID TREATMENT CARTRIDGES

(75) Inventors: Robert E. Astle, Middlefield, CT (US);
Hemang Patel, Wallingford, CT (US);
Mahesh Z. Patel, Plantsville, CT (US);
Thomas Holler, Glastonbury, CT (US);
Karl Fritze, Denmark Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 809 days.

(21) Appl. No.: 11/267,670

(22) Filed: Nov. 4, 2005

(65) Prior Publication Data

US 2006/0060512 A1 Mar. 23, 2006

Related U.S. Application Data

(63) Continuation-in-part of application No. 10/367,083, filed on Feb. 14, 2003, now abandoned.

(60) Provisional application No. 60/357,180, filed on Feb. 15, 2002, provisional application No. 60/628,634, filed on Nov. 17, 2004.

(51) Int. Cl.
*B01D 35/143* (2006.01)

(52) U.S. Cl. .................... 210/85; 210/100; 210/103; 340/607

(58) Field of Classification Search ............ 210/85–91, 210/96.1, 100, 103; 340/607; 702/45–47
See application file for complete search history.

(56) References Cited

U.S. PATENT DOCUMENTS 5,528,222 A 6/1996 Moskowitz et al.

(Continued)

FOREIGN PATENT DOCUMENTS

GB 2 303 082 A 2/1997

(Continued)

OTHER PUBLICATIONS

"Active RFID System Frequencies," May 24, 2004, IDTechEx: Active RFID System Frequencies, [Retrieved from the internet on Nov. 16, 2004], URL <http://www.idtechex.com/products/en/article.asp?articleid=24>, p. 1.

(Continued)

*Primary Examiner*—Terry K Cecil
(74) *Attorney, Agent, or Firm*—Aleksander Medved

(57) ABSTRACT

A fluid treatment system is provided, the system including a fluid treatment cartridge for treating fluid passing therethrough. The cartridge has an inlet through which untreated fluid enters the cartridge and an outlet from which treated fluid exits the cartridge. The cartridge also has a radio frequency identification (RFID) tag for storing data. The fluid treatment system also includes a connection manifold configured to detachably support the fluid treatment cartridge. The connection manifold has an inlet flow path for directing untreated fluid to the inlet of the cartridge and an outlet flow path for directing treated fluid from the outlet of the cartridge, and a data sensor for reading data stored on the RFID tag. Data stored on the RFID tag can be read by the data sensor and evaluated. Use of the fluid treatment system can be deterred based upon the evaluated data.

19 Claims, 15 Drawing Sheets

U.S. PATENT DOCUMENTS

| | | | |
|---|---|---|---|
| 5,674,381 | A | 10/1997 | Den Dekker |
| 5,919,360 | A | 7/1999 | Contaxis, III et al. |
| 6,024,867 | A | 2/2000 | Parise |
| 6,051,144 | A * | 4/2000 | Clack et al. .................. 210/739 |
| 6,139,739 | A | 10/2000 | Hamlin et al. |
| 6,186,140 | B1 | 2/2001 | Hoague |
| 6,315,130 | B1 | 11/2001 | Olsen |
| 6,558,444 | B1 | 5/2003 | Hunter |
| 6,632,355 | B2 | 10/2003 | Fritze |
| 6,711,524 | B2 | 3/2004 | Wolf et al. |
| 6,819,244 | B2 | 11/2004 | Dukler et al. |
| 6,953,526 | B1 | 10/2005 | Fritze |
| 2003/0010698 | A1 | 1/2003 | Fritze |
| 2003/0019819 | A1 | 1/2003 | Fritze |
| 2003/0024860 | A1 | 2/2003 | Fritze |
| 2003/0168389 | A1 | 9/2003 | Astle et al. |
| 2003/0217959 | A1 | 11/2003 | Fritze |
| 2004/0069695 | A1 | 4/2004 | Isobe et al. |
| 2004/0256328 | A1 | 12/2004 | Jornitz et al. |

FOREIGN PATENT DOCUMENTS

| | | | |
|---|---|---|---|
| WO | WO 02/074418 | A1 | 9/2002 |
| WO | WO 2004/085027 | A1 | 10/2004 |
| WO | WO 2005/091959 | A2 | 10/2005 |

OTHER PUBLICATIONS

"Basic components of an RFID system", Aug. 19, 2004, IDTechEx: Basic components of an RFID system, [Retrieved from the internet on Nov. 16, 2004], URL <http://www.idtechex.com/products/en/article.asp?articleid=42>, pp. 2.

"Chip vs Chipless RFID Smart Labels", May 20, 2004, IDTechEx: Chip vs Chipless RFID Smart Labels, [Retrieved from the internet on Nov. 16, 2004], URL <http://www.idtechex.com/products/en/article.asp?articleid=4>, p. 1.

"RFID System Frequencies", May 20, 2004, IDTechEx: RFID System Frequencies, [Retrieved from the internet on Nov. 16, 2004], URL <http://www.idtechex.com/products/en/article.asp?articleid=7>, p. 2.

"RFID tag type options", Jul. 9, 2004, IDTechEx: RFID tag type options, [Retrieved from the internet on Nov. 16, 2004], URL <http://www.idtechex.com/products/en/article.asp?articleid=41>, pp. 2.

* cited by examiner

Message Page

Deactivated Page

Homepage

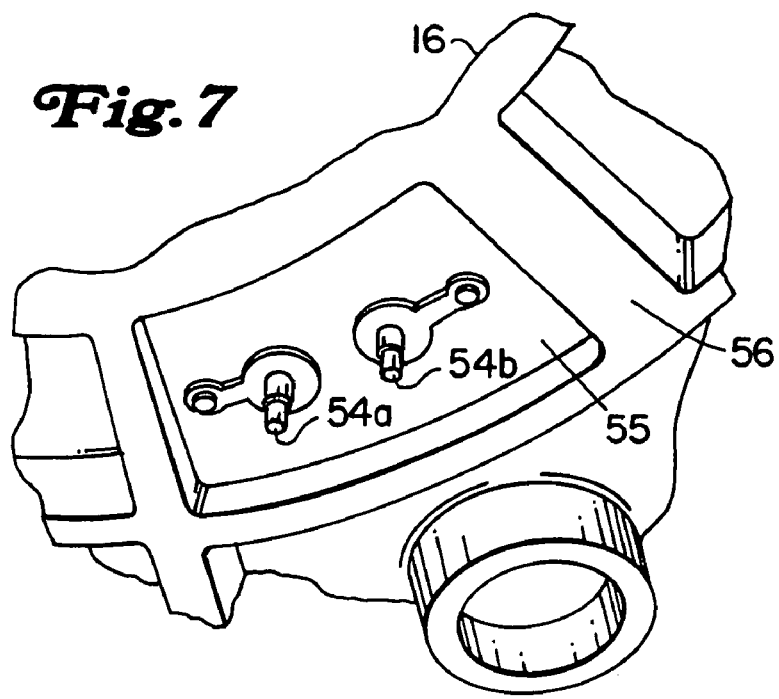
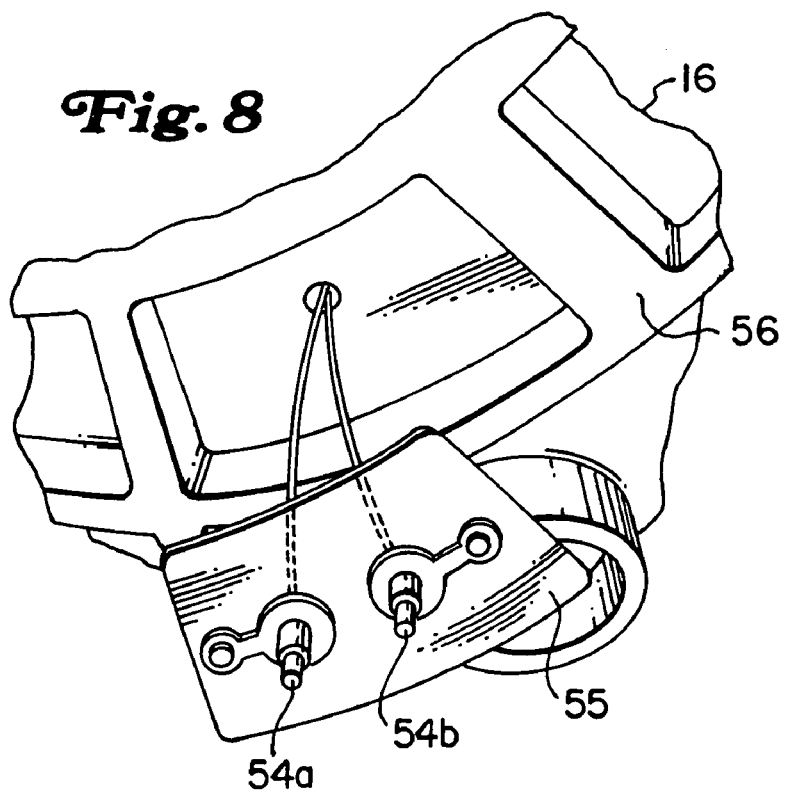

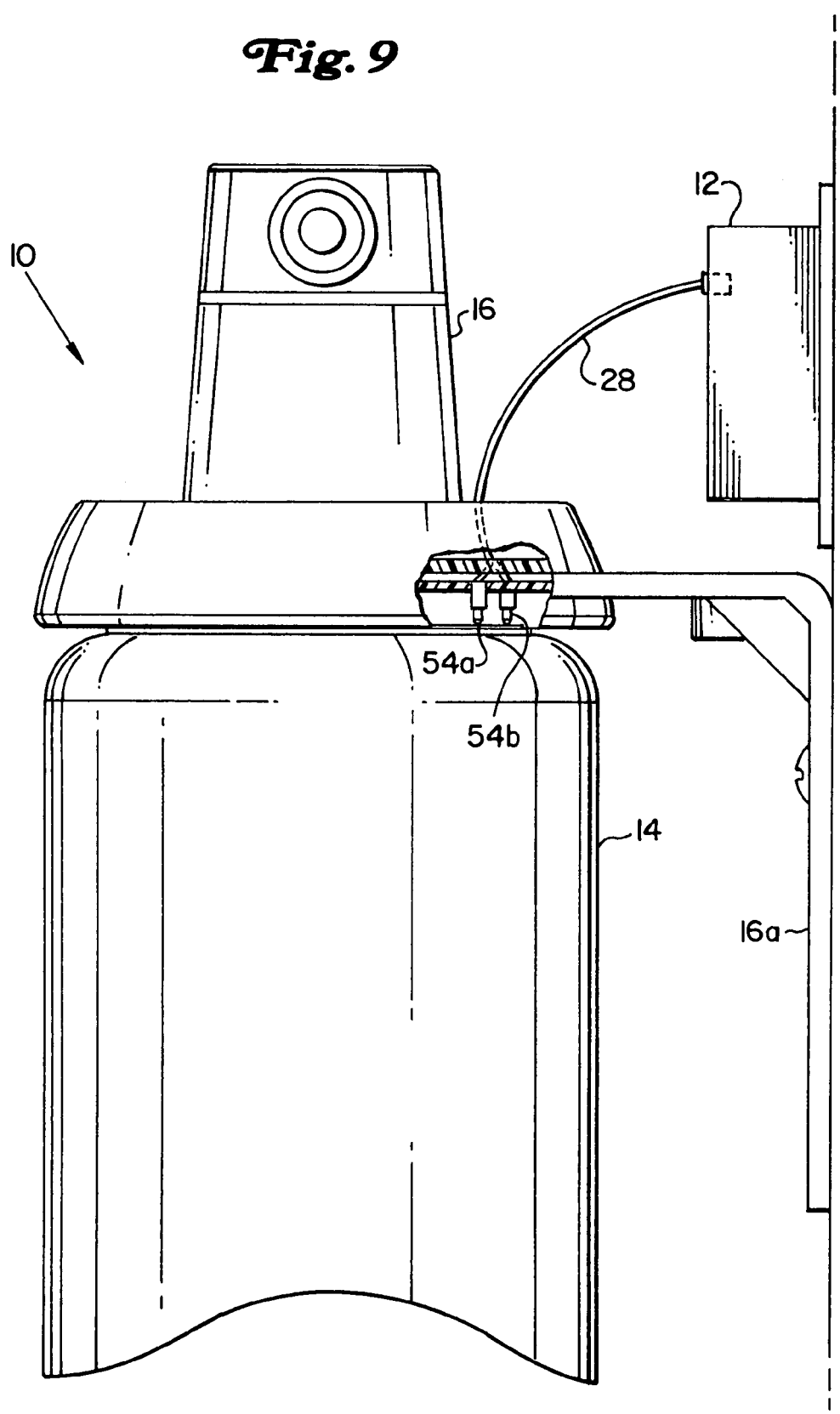

SYSTEM FOR MONITORING THE PERFORMANCE OF FLUID TREATMENT CARTRIDGES

CROSS-REFERENCE TO RELATED APPLICATIONS

This application is a continuation-in-part of U.S. patent application Ser. No. 10/367,083 filed Feb. 14, 2003, now abandoned, which claims the benefit of priority to U.S. Provisional Patent Application Ser. No. 60/357,180 filed Feb. 15, 2002; this application also claims the benefit of priority to U.S. Provisional Patent Application 60/628,634 filed Nov. 17, 2004, the disclosures of each are incorporated herein by reference to the extent not inconsistent with the present disclosure.

BACKGROUND OF THE DISCLOSURE

The subject invention is directed to fluid treatment systems and more particularly, to a system for monitoring the performance of replaceable and/or serviceable fluid treatment cartridges.

Replaceable and/or serviceable fluid treatment devices such as filter cartridges, additive dispensers, and the like are well known in the art and have been utilized for many years in residential and commercial fluid treatment systems. For the most part, the life of a fluid treatment cartridge is limited. For example, the life of a filter cartridge is limited by its contaminant holding capacity, while the life of an additive dispenser is limited by the amount of additive contained therein. In general, it is difficult for a user to know or to determine when a fluid treatment cartridge has exceeded its useful life and should therefore be removed, replaced and discarded, or in the case of a serviceable fluid treatment cartridge, when the cartridge should be backwashed, cleaned or regenerated.

One effort to resolve this problem is disclosed in U.S. Pat. No. 6,024,867 to Parise, which presents a counter top filter unit with a replaceable electronic display monitor mounted within the housing that supports the filter cartridge. The life span of the filter cartridge is shown on the display monitor in terms of colored indicator lights which denote whether the filter cartridge in within, nearing or outside its expected life span. The display monitor is electronically linked with associated flow monitoring components and a microprocessor for establishing the amount of water purified by the filter and for interpreting that amount in terms of the life span of the filter cartridge. While this system provides advantages over unmonitored filtration systems, the monitoring device must be replaced each time a new filter is employed. In other words, the monitoring system is not designed to be reset after a spent cartridge is removed.

In most instances, the replaceable and/or serviceable fluid treatment devices employed in commercial and consumer appliances are manufactured in accordance with particular design specifications and performance parameters provided by the appliance manufacturer. In many cases, the filter media used in such filters consists of a proprietary material or is manufactured using a proprietary process. Thus, appliance manufactures often recommend that replacement cartridges be purchased from the original equipment provider so as to ensure the integrity and proper operation of the filtering system.

Oftentimes, the owner of a household appliance or the maintenance personnel servicing a commercial vending machine is not aware of the replacement filter specifications and operating parameters of the filtering system. Consequently, they unknowingly jeopardize the integrity of the filtration system by replacing a used filter with an inferior or incompatible replacement filter supplied by an after-market manufacturer. Automotive filter manufacturers have also encountered this problem, as inferior replacement fuel filters are frequently installed in a vehicle without the knowledge of the vehicle owner or operator. Further, incompatible filter use can lead to malfunctioning of the filter, resulting in the use of unfiltered and potentially unsafe fluids and raising filter manufacturer liability issues related to harm caused by these unfiltered fluids.

It would be beneficial to provide a system for monitoring the performance of a replaceable and/or serviceable fluid treatment cartridge that is configured to be reset upon cartridge replacement and/or servicing and is adapted to prevent the use of unauthorized or incompatible replacement cartridges.

SUMMARY OF THE DISCLOSURE

The subject invention is directed to a new and useful fluid treatment system that includes a unique replaceable and/or serviceable fluid treatment cartridge and a connector head configured to detachably support the cartridge. The fluid treatment cartridge includes means for storing data and/or the identity of the fluid treatment cartridge and means for facilitating an exchange of data between the fluid treatment cartridge and a cartridge monitoring device. The system further includes a cartridge monitoring device adapted and configured to receive and process data and/or information from the fluid treatment cartridge.

In one embodiment of the subject invention, the data storing means of the cartridge is a dynamic data storage device, such as an electronic memory storage device, which stores at least cartridge performance set points. The set points include, for example, pressure drop set points, flow rate set points, capacity set points, and longevity (time in service) set points. Examples of electronic programmable memory devices that can be used in or on the cartridge as a dynamic storage device are RAM (random access memory), ROM (read-only memory), PROM (programmable read-only memory), EPROM (erasable programmable read-only memory), EEPROM (electronically erasable programmable read-only memory), a smart card, a radio frequency identification (RFID) tag, and flash memory. In another embodiment of the subject invention, the data storing means of the cartridge stores cartridge identification data, which is used by the cartridge monitoring device to retrieve cartridge performance set points from a lookup table.

In accordance with a preferred embodiment of the subject invention, sensing means are provided for measuring cartridge performance parameters such as, for example, the pressure drop across the cartridge and/or the flow rate of fluid through the cartridge. Depending upon the type of sensing means employed in the system, the sensing means may be associated with either one or both of the inlet flow path and/or the outlet flow path of the connector head. The subject invention further includes means for monitoring the cartridge performance parameters received from the sensing means, as well as means for comparing the cartridge performance parameters received from the sensing means with the cartridge set point data stored in the dynamic data storage device of the fluid treatment cartridge to determine whether a stored cartridge set point has been exceeded.

Means are operatively associated with at least one of the fluid treatment cartridge and the connector head for preventing fluid flow through the fluid treatment cartridge after a cartridge set point has been exceeded. Such means can take the form of an electronically controlled valving member or a similar flow control device. In addition to or as an alternative to the flow preventing means, the monitoring means has means associated therewith for indicating that a cartridge set point has been exceeded, for example, an alarm, a signal lamp, or a message display screen can be employed.

In another embodiment of the subject invention, the data storing means of the cartridge is a static data storage device that stores at least the identity of the fluid treatment cartridge. In such an instance, the means for facilitating an exchange of data between the fluid treatment cartridge and a cartridge monitoring device includes a device mounted in the connector head for receiving data from the static data storage device. In addition, there is means in communication with the connector head for processing the identification data stored in the static data storage device of the fluid treatment cartridge and received by the data reception device in the connector head to determine the identity of the fluid treatment cartridge.

The subject invention further includes means in communication with the connector head for processing the cartridge identification data stored in the static data storage device to determine the identity of the fluid treatment cartridge, and means are provided for accessing electronically stored cartridge set point data based on the identity of the fluid treatment cartridge. In this instance, the set point data can be stored in a monitoring device associated with the connector head, or at a remote location in communication with the connector head. It is envisioned that the static data storage device can take the form of a device configured to emit a magnetic signature identifying the fluid treatment cartridge or a device configured to present a graphical symbol, such as a bar code, identifying the fluid treatment cartridge. Accordingly, the means for receiving the identification data would take the form of a device for responding to a magnetic signature reading or a device for reading a bar code, which are well known in the art.

The subject invention is also directed to a fluid treatment system that includes a fluid treatment cartridge, and monitoring means electrically connected to the fluid treatment cartridge for monitoring data relating to cartridge performance. The monitoring means includes means for storing cartridge performance set point data, means for receiving cartridge performance data, and means for comparing the cartridge performance data to the performance set point data to determine whether a performance set point has been exceeded. In addition, the system includes means for terminating the electrical connection between the fluid treatment cartridge and the monitoring means when a performance set point has been exceeded, such that the monitor can no longer detect the presence of a fresh cartridge, and to encourage replacement of the spent fluid treatment cartridge. Preferably, the means for terminating the electrical connection between the fluid treatment cartridge and the monitoring means is a conventional fuse.

The subject invention is also directed to a fluid treatment cartridge that includes a cartridge housing defining an interior chamber containing a fluid treatment device for treating fluid passing therethrough, an inlet through which untreated fluid enters the interior chamber of the housing and an outlet from which treated fluid exits the interior chamber of the cartridge housing, and means associated with the cartridge housing for storing data relating to the fluid treatment cartridge. The means for storing data relating to the fluid treatment cartridge can be a dynamic data storage device or a static data storage device, and the means for storing data includes data relating to cartridge performance, data relating to cartridge identification, data relating to cartridge specifications, data relating to product offerings or similar forms of information.

The subject disclosure is also directed to a water filtration system that includes a distribution manifold and a replaceable cartridge filter capable of communicating filter service information to a controller. Filter service information can include a variety of filter specific information such as, for example, identification of a specific filter, type of filter, date of manufacture, flow capacity, media expiration date, source water quality requirements and the like.

Through a suitable logic device, the controller is adapted to compare the filter specific information with real time operating conditions such as flow rates, dates, and water qualities and determine when the operating conditions have exceeded or gone beyond the design criteria contained within the filter specific information. At such time, the distribution manifold can provide an indication, either visually or audibly, so as to warn a user that the service life of the cartridge filter has been consumed. In addition, the distribution manifold may include a shutdown mechanism, which requires attention prior to additional flow through the water filtration system.

In one embodiment, the water filtration system includes a filter cartridge having a data member capable of providing filter specific information to a sensor on the manifold. The manifold is configured to interface visually, electromagnetically (e.g., via a radio frequency signal), or physically with the data member and transmit information to a logic component on a controller. Based on filter specific information distinguishing one filter from any other filter and the operating conditions of the water filtration system, the logic component is adapted to provide an indication of a potential problem. In some embodiments, the logic component is adapted to terminate the filtering function of the water filtration system until any such problem has been rectified.

In another aspect, a method is provided for insuring filtered water quality by verifying that cartridge filters are not used in applications outside of their design criteria. For instance, a cartridge filter can communicate specific filter design information to a logic component of a controller such that the logic component can continually monitor and update the operational status of the cartridge filter. In some embodiments, the logic component can prevent further use of the cartridge filter if the operational status of the cartridge filter exceeds the specific filter design information.

The subject invention is also directed to a fluid treatment system including a fluid treatment cartridge for treating fluid passing therethrough. The cartridge has an inlet through which untreated fluid enters the cartridge and an outlet from which treated fluid exits the cartridge. The cartridge also has a RFID tag for storing data. The fluid treatment system also includes a connection manifold configured to detachably support the fluid treatment cartridge. The connection manifold has an inlet flow path for directing untreated fluid to the inlet of the cartridge, an outlet flow path for directing treated fluid from the outlet of the cartridge, and a data sensor for reading data stored on the RFID tag. The fluid treatment system further includes means for evaluating the data stored on the RFID tag and read by the data sensor, as well as means for deterring fluid treatment system use based upon the evaluation of the data stored on the RFID tag and read by the data sensor. In a particular embodiment, the data sensor reads the data stored on the RFID tag when the fluid treatment cartridge is brought into proximity with the data sensor such that the data evaluation means can evaluate the data stored on the RFID tag before the cartridge is mounted onto the connection manifold.

The subject invention is also directed to a fluid treatment system including a conduit for carrying fluid and a fluid treatment device in fluid communication with the conduit. The fluid treatment system also includes means for evaluating data stored on a RFID tag included with the fluid treatment device, as well as means for selectively deterring fluid treatment system use based upon the evaluation of the data stored on the RFID tag. In a particular embodiment, the means for selectively deterring fluid treatment system use includes means for selectively inhibiting fluid communication between the conduit and the fluid treatment device.

The subject invention is also directed to a cartridge for a fluid treatment system. The cartridge includes means for connecting to a fluid system to enable fluid communication between the cartridge and the fluid system, such that fluid of the fluid system flows through the cartridge. The cartridge also includes means for treating fluid flowing through the cartridge, and a RFID tag for storing cartridge data. Preferably, the fluid treatment system includes means for reading data stored on a RFID tag.

The subject invention is further directed to a manifold for a fluid treatment system. The manifold includes means for detachably supporting a fluid treatment cartridge such that the fluid treatment cartridge is in fluid communication with the fluid treatment system when the manifold supports the fluid treatment cartridge. Also included with the manifold is means for reading data stored on a RFID tag.

These and other features of the subject invention will become more readily apparent to those having ordinary skill in the art from the following detailed description of the preferred embodiments taken in conjunction with the drawings.

BRIEF DESCRIPTION OF THE DRAWINGS

So that those having ordinary skill in the art to which the subject invention appertains will more readily understand how to construct and use the system for monitoring the performance of replaceable and/or serviceable fluid treatment cartridges of the subject invention, reference may be had to the drawings wherein:

FIG. 7 is a perspective view from below of a section of the connector head shown in FIG. 1 illustrating a pair of contact pins for communicating with the printed circuit board provided on the upper end of the fluid treatment cartridge;

FIG. 8 is a perspective view as in FIG. 7, with the contact pin mounting plate separated from the connector head for ease of illustration;

FIG. 9 is a side elevational view of the monitoring system of the subject invention showing the fluid treatment cartridge detachably engaged with the connector head, with a portion of the connector head broken away to illustrate engagement between the contact pins and the contact pads on the printed circuit board;

These and other features of the fluid treatment system of the subject invention will become more readily apparent to those having ordinary skill in the art from the following detailed description of the preferred embodiments.

DETAILED DESCRIPTION OF THE DISCLOSURE

Figure 1:
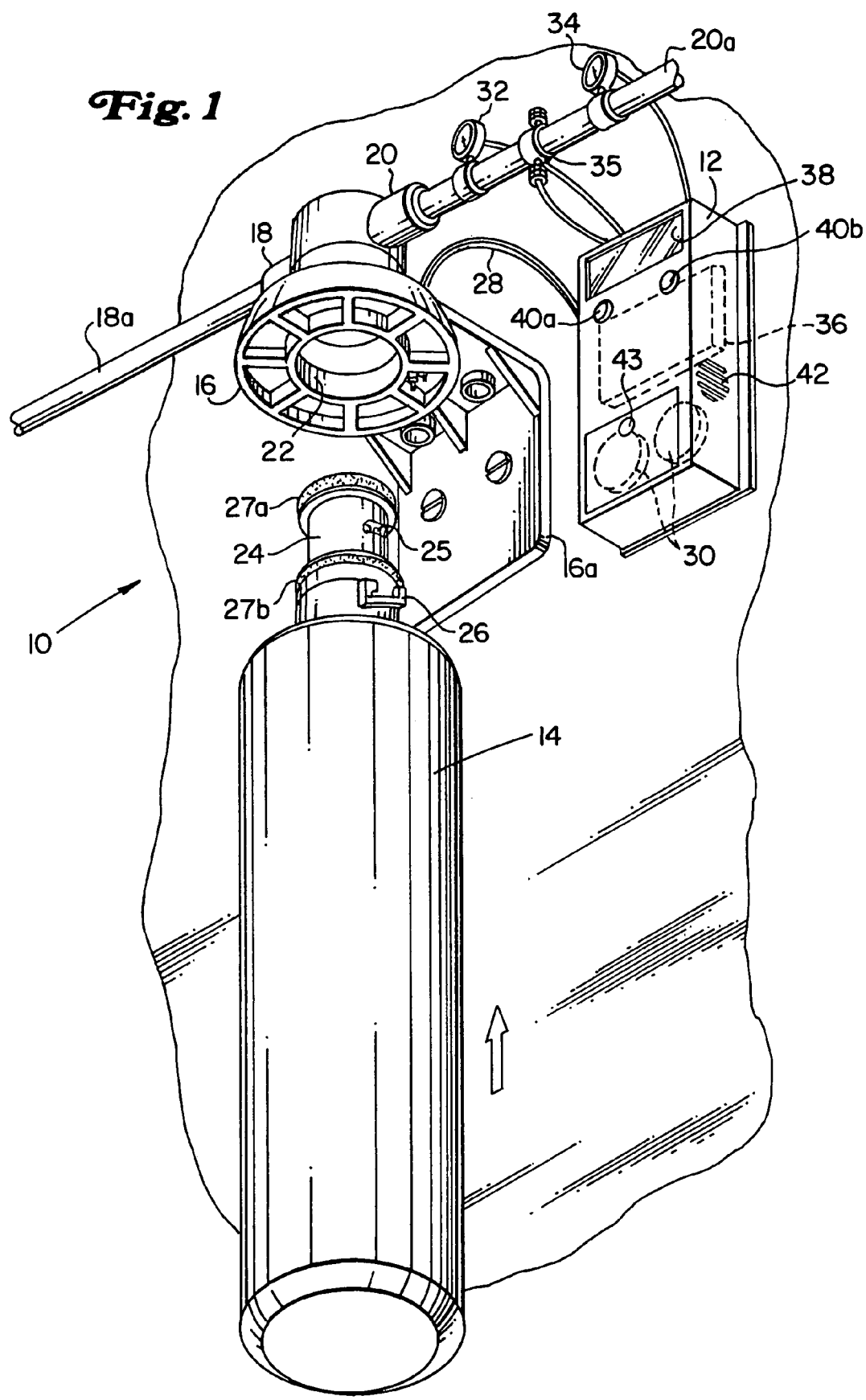
FIG. 1 is a perspective view of a system for monitoring the performance of a fluid treatment cartridge constructed in accordance with a preferred embodiment of the subject invention which includes a monitoring device for communicating with a fluid treatment cartridge configured to store data relating to cartridge performance, wherein the monitoring device includes, among other things, a display panel for conveying information relating to the performance of the cartridge.

Referring now to the drawings wherein like reference numerals identify similar structural elements and/or features of the subject invention, there is illustrated in FIG. 1 a system for monitoring the identity and performance of a replaceable and/or serviceable fluid treatment cartridge constructed in accordance with a preferred embodiment of the subject invention and is designated generally by reference numeral 10. This system monitors the performance of a replaceable fluid treatment cartridge, such as a filter, coalescer, or additive dispenser or a serviceable fluid treatment cartridge such as a backwashable, regenerative or cleanable cartridge or a similar device to determine whether the cartridge is operating within predefined performance parameters or more importantly, whether the cartridge has exceeded one or more predefined performance set points and is therefore due for replacement. The system may also be adapted to maintain the integrity of a fluid treatment process by preventing the use of an unauthorized or incompatible cartridge, such as a cartridge manufactured by an unauthorized after-market supplier.

In general, system 10 includes an electronic monitoring device 12 for communicating, either directly or indirectly, with a fluid treatment cartridge 14 configured to store data such as cartridge performance data, cartridge identification data, cartridge specification data or even product advertising information. It is envisioned that cartridge performance data, such as performance set points relating to the pressure drop across the cartridge, the flow rate through the cartridge, or the time the cartridge has been in service, can be stored on or in the cartridge either by way of a static data storage device (e.g., a bar code, magnetic data label, a physical contact mechanism, and the like) or a dynamic data storage device (e.g., an electronic programmable memory storage device such as a read-only memory (ROM), a programmable ROM (PROM), an erasable PROM (EPROM), or an electrically erasable PROM (EEPROM), a smart card, a RFID tag, a flash memory, and the like) to be discussed in more detail hereinbelow. It is also envisioned that cartridge identification data, such as the identity of the cartridge manufacturer, serial numbers or other indicia of component parts, manufacturing date, expiration date, treatment capacity, and the like, can be stored on or in the cartridge by way of a static or dynamic data storage means so as to permit the use of compatible and/or authorized cartridge while preventing the use of an unauthorized or incompatible cartridge. In some cases, cartridge identification data (e.g., a part number) can be used by the monitoring device 12 to retrieve more detailed, cartridge-specific data from a lookup table.

It is envisioned that the monitoring device 12 will continuously decrement the remaining life of the cartridge based upon the stored set points, and in the case of a dynamic memory storage device, it is envisioned that the decremented values will be stored in the data storage device of the cartridge so that the temporary removal of the cartridge from the system would not effect the integrity of the monitoring system.

As illustrated in FIG. 1, cartridge 14 is adapted and configured to interact with, communicate with, and otherwise detachably interconnect with a connector head ("distribution manifold" or "manifold") 16 that is in direct communication with a source of treatable fluid, such as, for example, a source of untreated drinking water. More particularly, connector head 16 has an inlet portion 18 for communicating with a fluid supply line 18a and an outlet portion 20 for communicating with a fluid outlet conduit 20a. Connector head 16 further defines an axial bore 22 for operatively receiving the upper neck portion 24 of cartridge 14. Neck portion 24 is provided with radial inlet ports 25a bounded by upper and lower o-ring seals 27a, 27b for communicating with the inlet portion 18 of connector head 16, and an axial outlet port 25b (see FIG. 6) for communicating with the outlet portion 20 of connector head 16. The inlet ports 25a in neck portion 24 allow untreated fluid to enter the interior chamber of fluid treatment cartridge 14 from the fluid supply line 18a by way of inlet portion 18, and the outlet port 25b permits treated fluid to exit the interior chamber of fluid treatment cartridge 14 into the fluid outlet conduit 20a by way of outlet portion 20. Connector head 16 is also optionally provided with an integral generally L-shaped mounting bracket 16a for securement to a supporting structure such as a wall.

With continuing reference to FIG. 1, keyed camming lugs 26 are operatively associated with the lower portion of neck portion 24 to interact and mate with corresponding keyed recesses (not shown) that are formed within the axial bore 22 of connector head 16 to ensure cartridge compatibility, that is to prevent engagement with an incompatible cartridge. A similar keyed lockout system is disclosed in commonly assigned U.S. Pat. No. 6,458,269 to Bassett et al., the disclosure of which is herein incorporated by reference in its entirety. It is envisioned and well within the scope of the subject disclosure that a keyed camming lug such as that shown in FIG. 3 and described in the Bassett et al. patent could operate as a static memory device in conformance with the objectives of the subject invention, whereby the monitoring device would recognize a particular key configuration as a signature or identifying feature of a specific type or model of fluid treatment cartridge (e.g., a cartridge from a particular manufacturer), and would attribute certain operating parameters to that cartridge.

Figure 20:
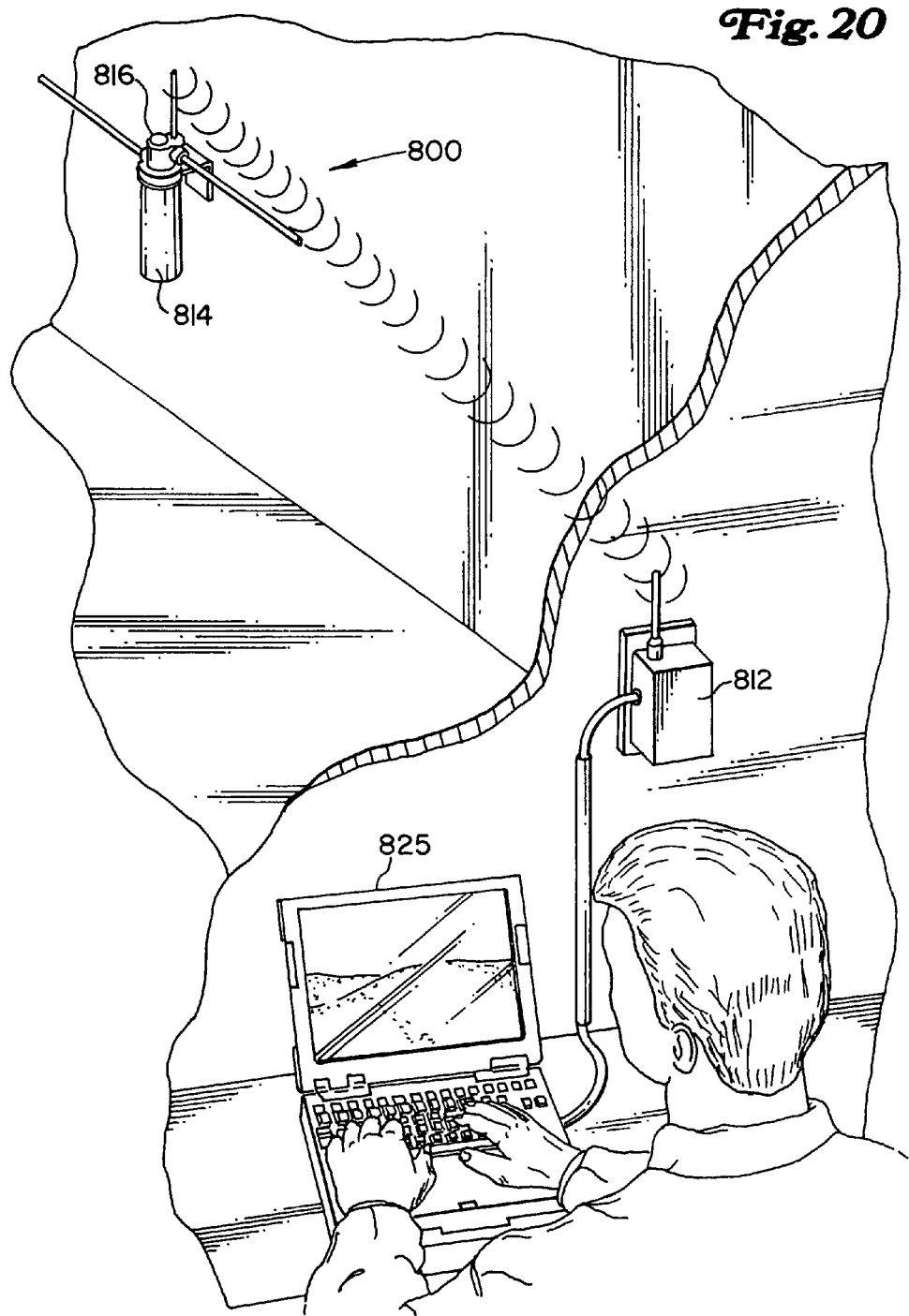
FIG. 20 is an illustration of a system for remotely monitoring the performance of a replaceable fluid treatment cartridge, wherein the system is configured to facilitate wireless communication with the connector head so as to download and upload data relating to the performance of the fluid treatment cartridge associated therewith.

As illustrated in FIG. 1, monitoring device 12 communicates with the connector head 16 by way of a hard-wired connection 28. Alternatively, as illustrated in FIG. 20, which will be discussed in more detail hereinbelow, connector head 16 can communicate with a monitoring station by way of a wireless connection. Whether the monitoring device communicates with connector head by means of hard wiring or wirelessly, the monitoring device can be located either on the connector head or remotely. The monitoring device 12 can contain an on-board power supply such as batteries 30, which can serve as a primary power source or as an auxiliary power supply in case of a loss of external power. The monitoring device 12 communicates with a plurality of sensors operatively associated with the inlet and/or outlet conduits that communicate with the connector head 16 and cartridge 14. These sensors include, for example, a pressure transducer 32 for measuring the local pressure and/or the pressure drop across fluid treatment cartridge 14 and a flow meter 34 for measuring the flow rate through cartridge 14. In another particular embodiment, monitoring device 12 is located remotely from connector head 16, rather than being secured to connector head 16 as shown in FIG. 1.

Monitoring device 12 is preferably controlled by a microprocessor 36 that coordinates communication between the cartridge 14 and the monitoring device 12, and processes cartridge performance data received from a memory storage device of cartridge 14 as well as from the sensors 32 and 34. It is envisioned that microprocessor 36 would be integrated with a dip-switch (not shown) for selecting between a plurality of flow rate values (e.g., 0.5 gpm, 0.75 gpm, 1 gpm and 1.5 gpm) depending upon the designated flow rate set point of the particular cartridge being employed in the fluid treatment system. The microprocessor 36 preferably includes an integrated timing circuit for measuring the useful life of cartridge 14. The timing circuit may be triggered when the cartridge 14 initially engages connector head 16 or the timing circuit may cooperate with a flow sensor or similar device so that the timer is incremented only when fluid is flowing through the cartridge. In a particular embodiment, monitoring device 12 also includes memory (not shown), such as ROM, for storing data to be operated on by the microprocessor 36 or transmitted elsewhere. The memory can be included on the microprocessor 36.

Figure 2:
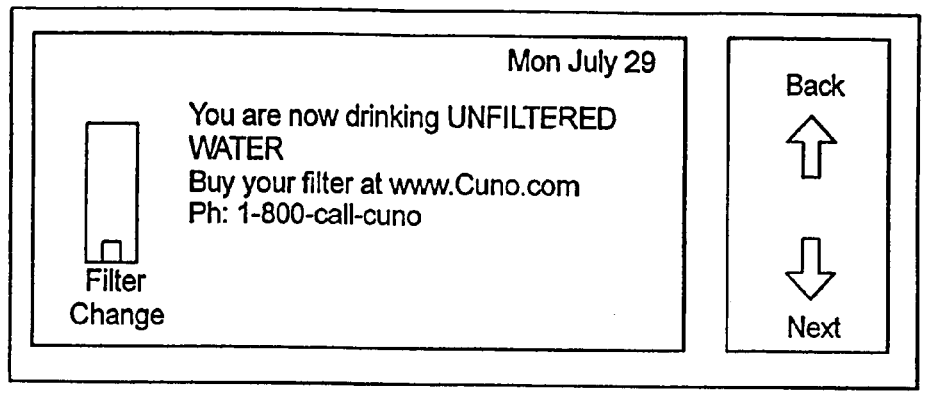
FIGS. 2 through 4 are exemplary display panel screens used by the monitoring device to convey information relating to the performance of the cartridge performance, including a message page, a deactivated page and a homepage.
Figure 3:
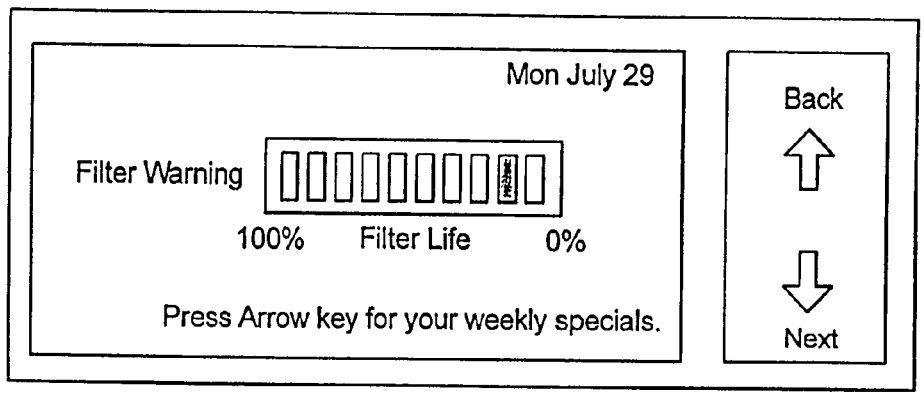
Figure 4:
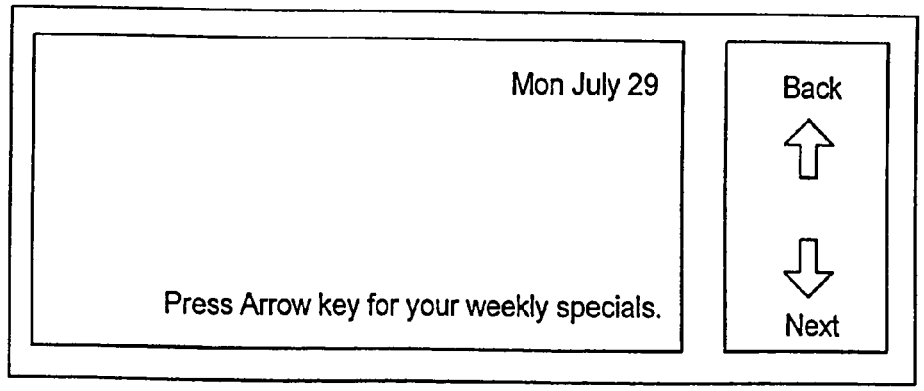

Monitoring device 12 further includes a display panel, such as a liquid crystal display panel 38, connected to microprocessor 36 for presenting information to an observer concerning the operating parameters of a cartridge, such as the warning shown on the sample display page of FIG. 2, or the graphics showing the life expectancy of the cartridge on the sample page of FIG. 3. It is also envisioned that the display panel 38 can present product specifications, product advertisements, manufacturer coupons, informational messages about a product or new product offerings such as for example weekly specials as offered on the sample page shown in FIG. 4. This data could be supplied to the monitoring device 12 through an up-link with the internet or world wide web, as illustrated for example in FIG. 20, or the information can be stored by the cartridge manufacturer in a preprogrammed on-board memory storage device.

With continuing reference to FIG. 1, monitoring device 12 further includes indicator lamps or diodes connected to the microprocessor 36 to provide a visual indication to an observer of the operating condition of a cartridge. For example, a green lamp or diode 40a is provided and will be illuminated when the cartridge 14 is operating within its operating limits. A red lamp or diode 40b is provided and will be illuminated when a cartridge 14 has exceeded one or more operating limits or performance set points. A speaker 42 is also provided and is connected to the microprocessor 36 to sound an alarm when a cartridge operating parameter or set point has been exceeded. The alarm may be sounded periodically or continuously. Monitoring device 12 includes a reset button 43 that turns the alarm off only for a predefined time period, for example two days, after which time the alarm will sound again until the spent cartridge is removed and replaced.

Figure 5:
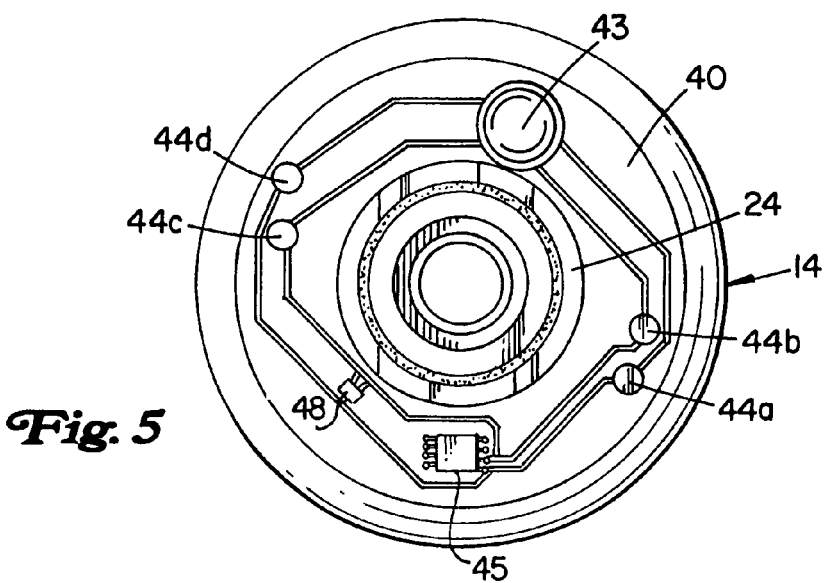
FIG. 5 is a top plan view of the upper end of the fluid treatment cartridge illustrated in FIG. 1, which includes a powered circuit board containing an electronic device adapted to store data relating to cartridge performance.
Figure 6:
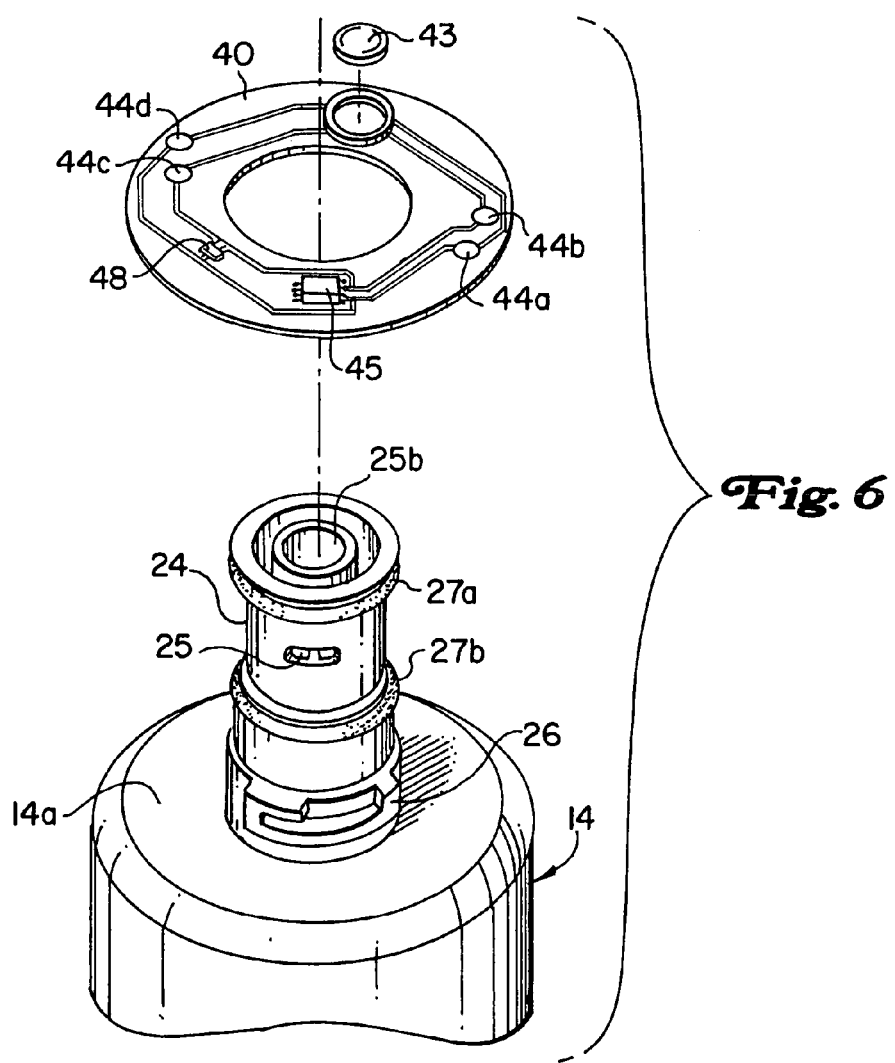
FIG. 6 is an exploded perspective view of the upper end portion of the fluid treatment cartridge illustrated in FIG. 1 with the printed circuit board separated from the cartridge for ease of illustration.

Referring now to FIGS. 5 and 6 in conjunction with FIG. 1, there is illustrated a printed circuit board 40 operatively associated with the upper end surface 14a of the fluid treatment cartridge 14. Printed circuit board 40 includes a dynamic memory storage device 45 in the form of an electronic programmable memory chip (e.g., EEPROM, the commercially available form of which can store up to 2 MB of data). As noted above, the memory chip can be programmed to store performance set points and can be adapted to receive information from the monitoring system in the form of updated cartridge performance data derived by sensors 32, 34. This information transfer can occur periodically, or in near real time. It is envisioned that a power cell or battery 43 may be supported on circuit board 40 to provide power to the memory chip 45. Alternately, the power cell or another power source can be associated with another component of the performance monitoring system 10, such as the monitoring device 12 or the connector head 16.

Diametrically opposed paired contact pads 44a, 44b and 44c, 44d are defined on circuit board 40 for cooperatively interacting with paired contact pins 54a, 54b supported on a mounting plate 55 on the undersurface 56 of connector head 16 shown in FIGS. 7 and 8. By providing two pairs of contact pads on circuit board 40, the user does not have to be concerned with the proper alignment of the cartridge 14 prior to installation in the connector head 16.

It is envisioned that circuit board 40 could include an embedded microprocessor (see for example electronic component 48) which is programmed to compare cartridge performance data received from the monitoring device 12 with the performance set points stored on the memory chip 45, to calculate the remaining life of cartridge 14. It is envisioned that the microprocessor may be associated with another part of the monitoring system, other than the filter cartridge itself, such as, for example, the monitoring device 12 or the connector head 16. If a set point is exceeded, the on-board microprocessor 48 would communicate the circumstance to the monitoring device 12, whereupon an alarm could be sounded through speaker 42, a red indicator lamp 40b could be illuminated, or a message could be displayed on panel 38. For example, if the cartridge is in the form of a potable water filtration device, a message could be displayed in the manner presented in FIG. 2, which informs an observer that they are drinking unfiltered water.

Referring to FIG. 9 in conjunction with FIG. 1, when the neck portion 24 of fluid treatment cartridge 14 is securely engaged and installed within the axial bore 22 of connector head 16, contact pins 54a, 54b are in electrical contact with one pair of contact pads (e.g., pads 44a, 44b) and a communication link is created between cartridge 14 and monitoring device 12, to facilitate the exchange of information and data therebetween. Once the communication link is established, cartridge performance data, such as performance set points or related information, can be uploaded to the monitoring device 12 from the dynamic memory storage device 45 of cartridge 14. These set points will then be utilized by the monitoring device 12 for comparison against measured performance data received from the pressure and flow sensors 32 and 34 to determine when the cartridge 14 is to be removed, discarded, and replaced with a new cartridge. In some cases, such as with cartridge identification information, it may be most useful to program reference information directly into the monitoring device 12, such that the information uploaded from cartridge 14 to monitoring device 12 can be compared to such predetermined parameter values, rather than to values collected from an external source.

By way of example, the pressure transducer 32 will monitor the pressure drop across the cartridge 14 periodically, for example, every ten minutes. When the pressure drop across the cartridge increases above a set point (e.g., 20 psi), a count value will be stored in temporary memory. The monitoring device 12 will continue to store count values for consecutive high pressure drop readings. If monitoring device 12 detects high pressure drops for three consecutive readings, action will be taken in the form of an alarm, red indicator lamp or message display to inform an observer that a performance set point has been exceeded. Other control logic arrangements are possible, including for example, control logic that stores count values after non-consecutive high pressure drop readings.

By way of another example, a flow switch 34 in the form of a reed switch could communicate with monitoring device 12. If the reed switch is in an open position, there is no fluid flowing through cartridge 14. If the switch is closed, then fluid is flowing through cartridge 14 and monitor 12 processes the data by multiplying the time of flow with a preset flow rate (set by a dip switch) to obtain a value for the volume of flow through the cartridge (gallons). It is envisioned that this value can be stored in the monitoring device, at a remote location or periodically downloaded to the memory chip 45 on cartridge 14 for storage. Once monitoring device 12 determines through computations that the set point for flow through the cartridge has been exceeded, action will be taken in the form of an alarm, red indicator lamp or message display to inform an observer of that occurrence. Instead of or in addition to the flow switch 34, a turbine style flow meter (a frequency pulse meter) 35 can be employed to provide input to the monitoring device 12. This type of sensor is configured to count a number of pulses and multiply that number by a preset gain to determine the volume of flow through cartridge 14.

In another preferred embodiment, dynamic memory storage device 45 of cartridge 14 is a RFID tag. The communication link between the cartridge 14 and the monitoring device 12 is then a wireless link. Examples of suitable chip-based and chipless RFID tags can include various configurations such as, for example, those disclosed in U.S. Pat. Nos. 5,528,222 and 6,819,244, each of which is herein incorporated by reference to the extent not inconsistent with the present disclosure. Both monitoring device 12 and connector head 16 communicate with and read information from the cartridge 14 by transmitting electromagnetic radiation (i.e., a RF signal) to the dynamic memory storage device 45 of cartridge 14, which then communicates back to monitoring device 12 and/or connector head 16. Monitoring device 12 and connector head 16 may transmit a RF signal at designated time periods such as, for example, every minute or every hour, or based upon a fluid use criteria.

Figure 10:
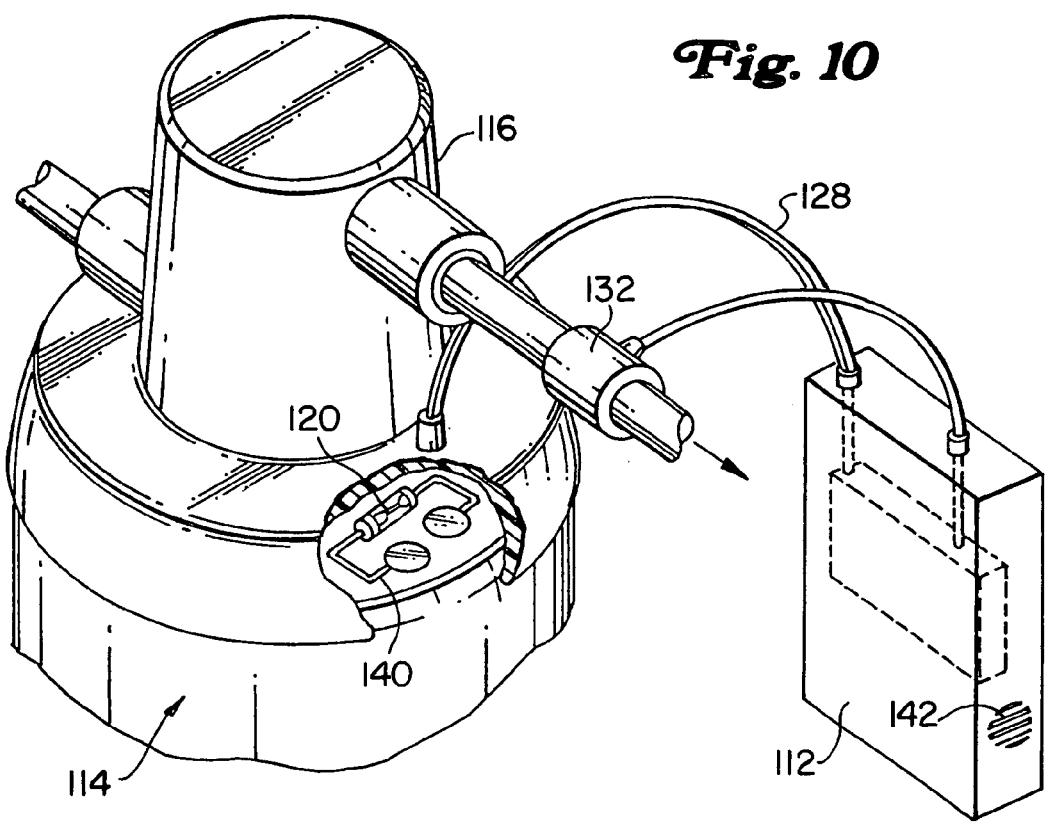
FIG. 10 is perspective view of another version of a system for monitoring the performance of a fluid treatment cartridge wherein the cartridge includes a circuit containing a conventional fuse, which is electrically connected to a controller, wherein the fuse remains intact when the cartridge is operating within preset parameters recognized by the controller.
Figure 11:
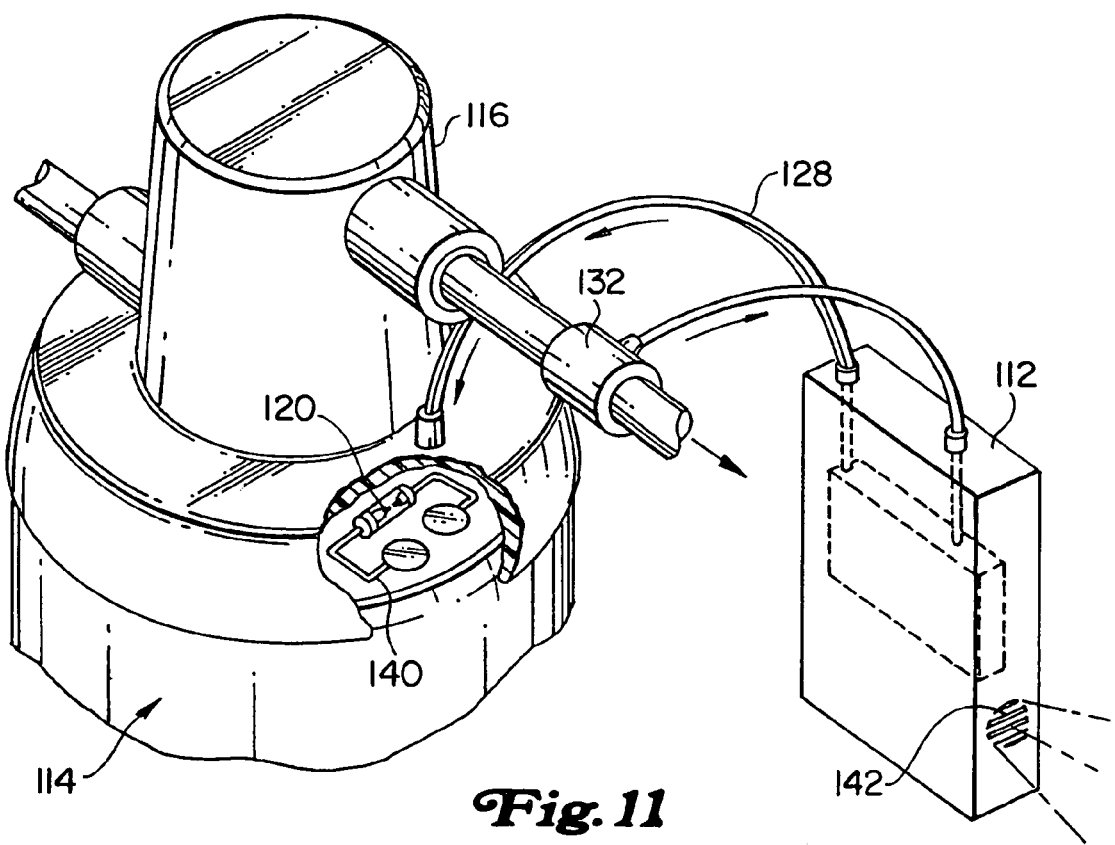
FIG. 11 is a perspective view as in FIG. 10, wherein the fuse is burned by a surge provided by the controller in response to a preset cartridge operating parameter having been exceeded, and wherein an alarm is sounded as a result thereof.

Referring now to FIGS. 10 and 11, there is illustrated another fluid treatment cartridge 114 constructed in accordance with a preferred embodiment of the subject invention which includes an integrated circuit 140 containing a conventional fuse 120 that is in electrical communication with monitoring device 112 through connector head 116 by way of wire 128. The monitoring device 112 receives data from a sensor, for example a pressure or flow sensor 132, and compares that data with stored performance data relating to cartridge 114. When a performance set point has been exceeded by a measured or sensed operating parameter, the monitoring device 112 will send a surge to the cartridge circuit 140 to burn the fuse 120. Once fuse 120 has burned, the circuit 140 will be open and an alarm 142 will sound or a similar action will be taken to inform an attendant that a set point has been exceeded and the cartridge should be removed, discarded and replaced.

Figure 12:
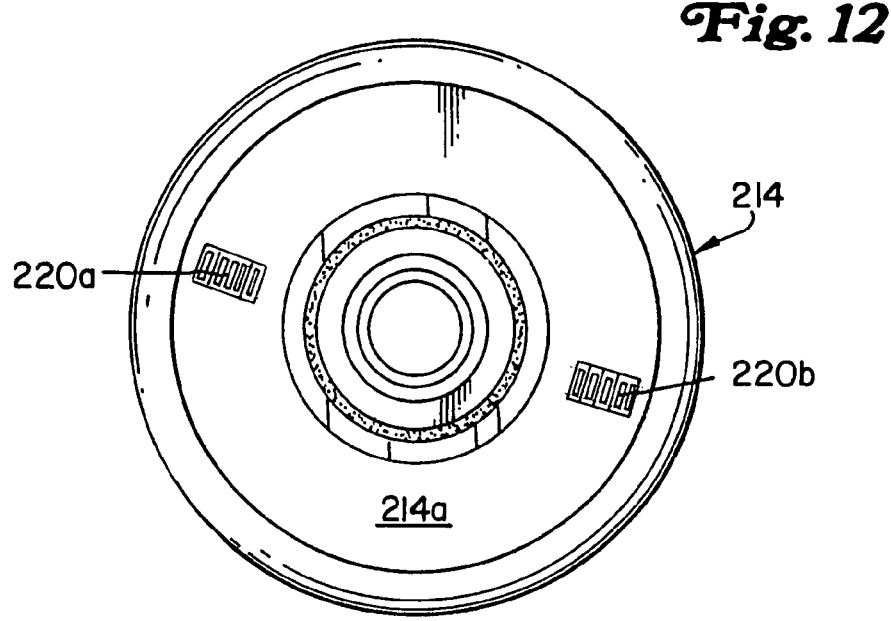
FIG. 12 is a top plan view of the upper portion of a fluid treatment cartridge constructed in accordance with a preferred embodiment of the subject invention that includes graphical bar code for communicating with corresponding bar code readers disposed in the connector head.
Figure 13:
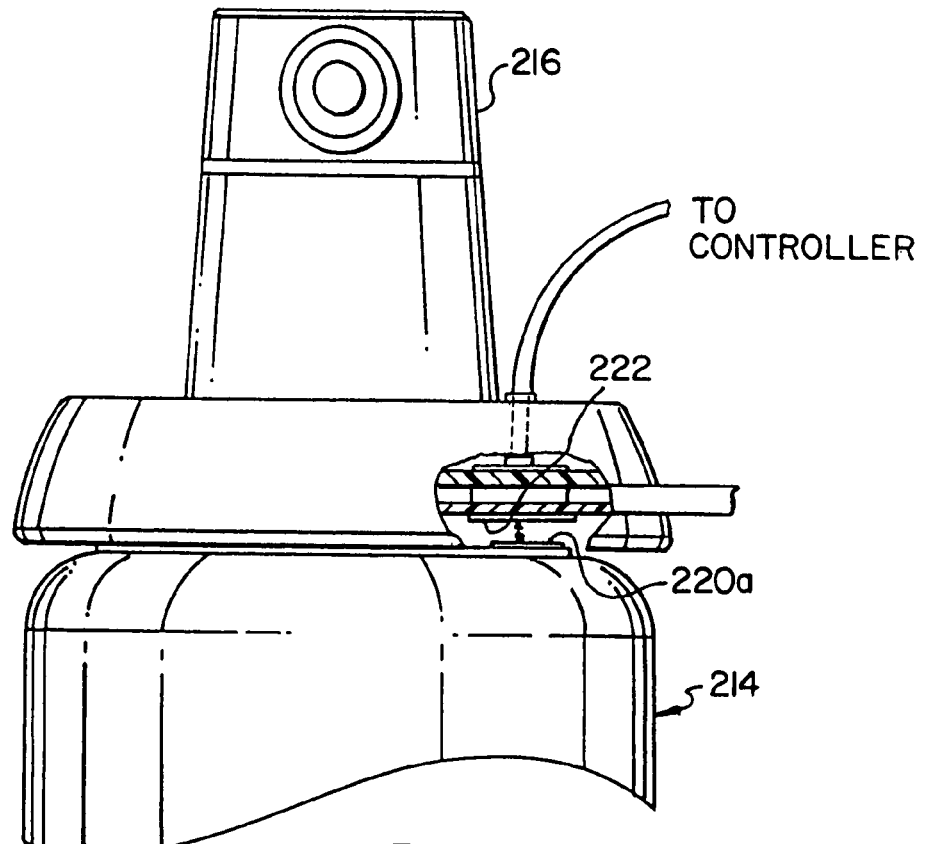
FIG. 13 is a side elevational view of the fluid treatment cartridge of FIG. 12 detachably engaged with a connector head containing bar code readers for identifying the cartridge by way of its bar code signature.

Referring to FIGS. 12 and 13, there is illustrated another fluid treatment cartridge 214 constructed in accordance with a preferred embodiment of the subject invention which includes a static memory storage device in the form of diametrically opposed graphical bar code 220a, 220b. The bar codes present cartridge performance set point data and are positioned on the upper surface 214a of cartridge 214 to interact with a bar code scanner 222 mounted on the under surface of the connector head 216. The scanner 222 communicates with a monitoring device or controller. Upon installing or engaging the cartridge 214 with the connector head 216, the relative rotation of the bar codes (e.g., bar code 220a) with respect to the scanner 222 causes the performance set point data represented by the bar code to be transmitted to the monitoring device for comparison with sensed performance parameters obtained by the monitoring device.

In an alternate embodiment of the invention, the bar codes 220a, 220b may simply provide the monitoring device or controller with identification data in the form of a graphical signature that causes the monitoring device to access stored cartridge performance set points corresponding to the identified cartridge from a library of stored set points that have been loaded into the monitoring device by the cartridge manufacturer, for example, into memory incorporated into the monitoring device. Furthermore, the monitoring device could be programmed to sound an alarm if the bar code provided on the cartridge does not represent a recognized signature. This would prevent the use of unauthorized and/or incompatible cartridge, so as to maintain the integrity of the fluid treatment system. Alternatively, failure to detect an appropriate bar code could activate a physical lock-out mechanism located on the connector head 16, the lock-out mechanism serving to physically prevent the attachment of an unauthorized cartridge to the connector head 16. In another alternative embodiment, the connector head is by default locked out such that a cartridge cannot be attached, the connector head only accepting a cartridge when appropriate identifying information is received by the monitoring device.

Figure 14:
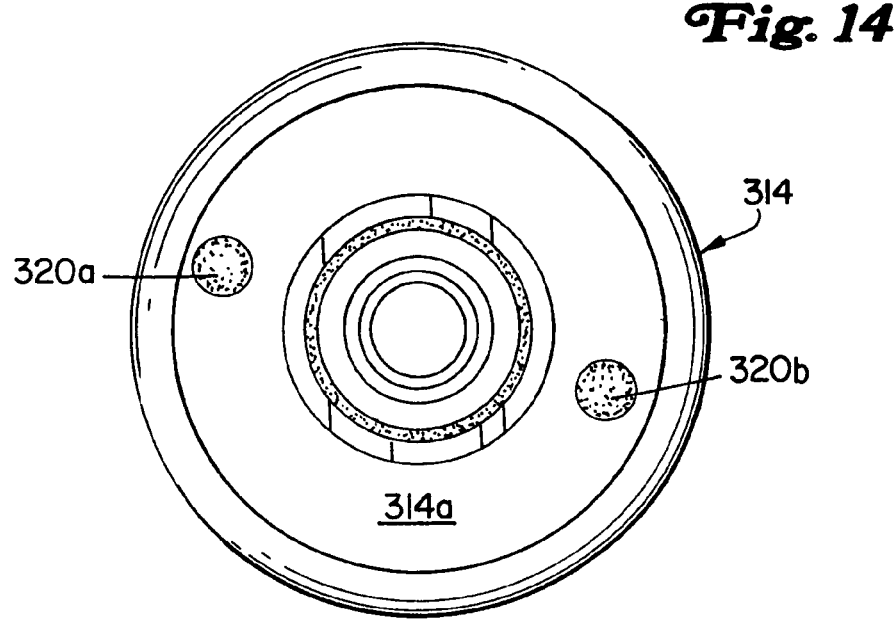
FIG. 14 is a top plan view of the upper portion of a fluid treatment cartridge constructed in accordance with a preferred embodiment of the subject invention, which includes magnetic signature generating devices for communicating with corresponding reed switches disposed in the connector head.
Figure 15:
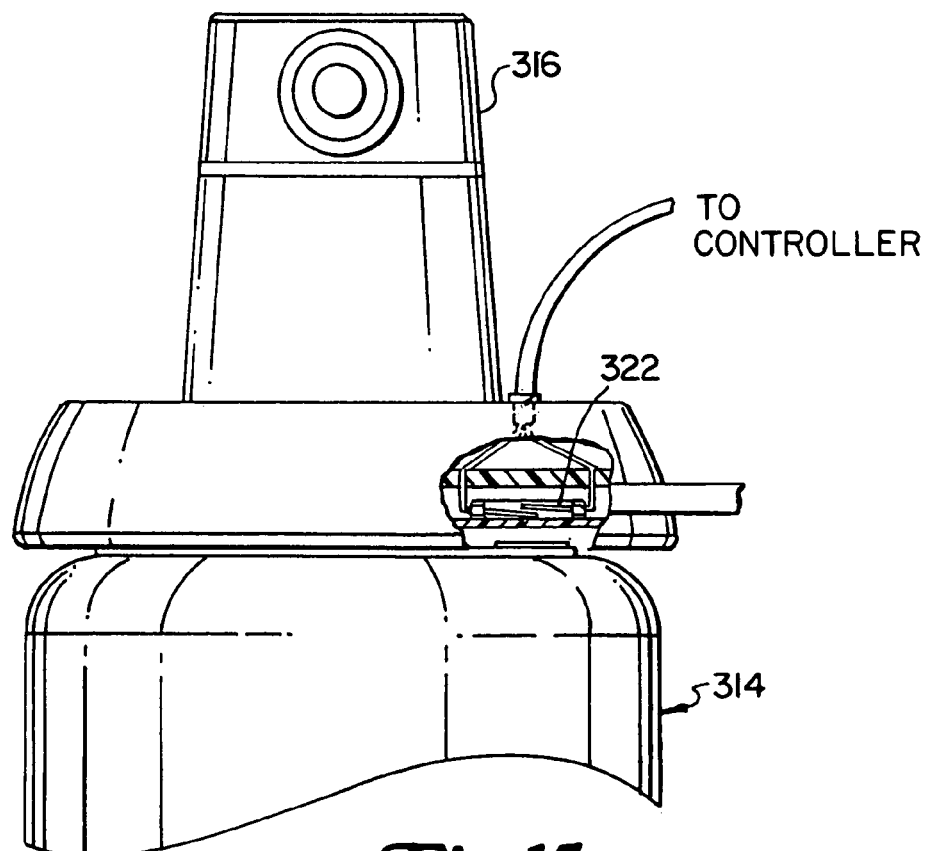
FIG. 15 is a side elevational view of the fluid treatment cartridge of FIG. 14 detachably engaged with a connector head containing reed switches for identifying the cartridge by way of its magnetic signature.

Referring to FIGS. 14 and 15, there is illustrated another fluid treatment cartridge 314 constructed in accordance with a preferred embodiment of the subject invention which includes a static memory storage device in the form of diametrically opposed magnetic field generating devices 320a, 320b. The magnetic field generating devices are positioned on the upper surface 314a of cartridge 314 to interact with at least one reed switch 322 mounted on the under surface of the connector head 316. The reed switch 322 communicates with a monitoring device or controller, and is adapted to close in the presence of a specific magnetic field. Thus, when a compatible cartridge is installed or engaged in the connector head 316, the reed switch 322 will close and the monitor will recognize the cartridge.

The magnetic field generating devices 320a, 320b of cartridge 314 will thereby provide the monitoring device or controller with identification data in the form of a magnetic signature that causes the monitoring device to access stored cartridge performance set points corresponding to the cartridge from a library of stored set points that have been loaded into the memory of the monitoring device by the cartridge manufacturer. As with the bar code feature, the monitoring device 312 could be programmed to sound an alarm or activate a physical lock-out mechanism if the magnetic field provided on the cartridge does not represent a recognized signature. This would prevent the use of unauthorized and/or incompatible cartridge, so as to maintain the integrity of the fluid treatment system.

Figure 16:
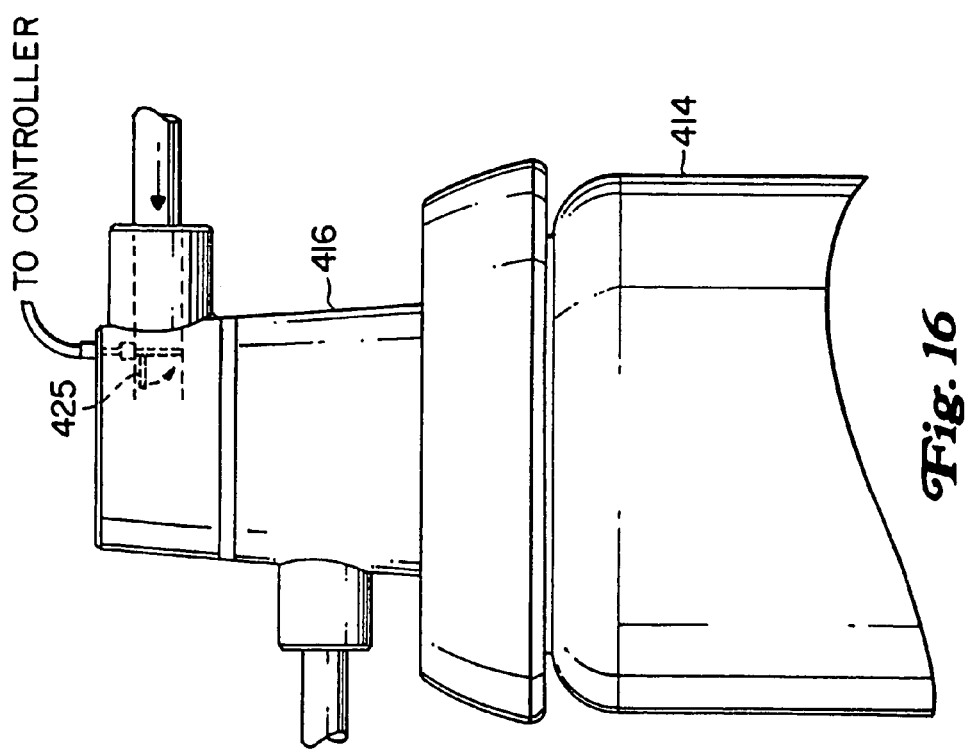
FIG. 16 is a side elevational view of a fluid treatment system constructed in accordance with a preferred embodiment of the subject invention wherein a valve member connected to a monitoring device is disposed within the flow path in the connector head to prevent the flow of fluid into the fluid treatment cartridge when a set point has been exceeded.

Referring now to FIG. 16, there is illustrated an embodiment of the subject invention which includes a connector head 416 having an electronically controlled valve member 425 for selectively preventing fluid flow through the fluid flow path of the connector head 416. The valve member 425 is operatively associated with a controller in the monitoring device and is adapted and configured to move to a closed position when, for example, the monitoring device determines that a performance set point associated with the cartridge 414 has been exceeded. Alternatively, the valve member 425 may be moved to a closed position to prevent flow through the connector head 416 when the monitoring device determines that the cartridge is incompatible with the fluid treatment system, e.g., it originated from an unauthorized after market supplier. This could happen in the presence of an incorrect bar code or magnetic signature, or in the absence of either of the same when one is expected to be present.

Figure 17:
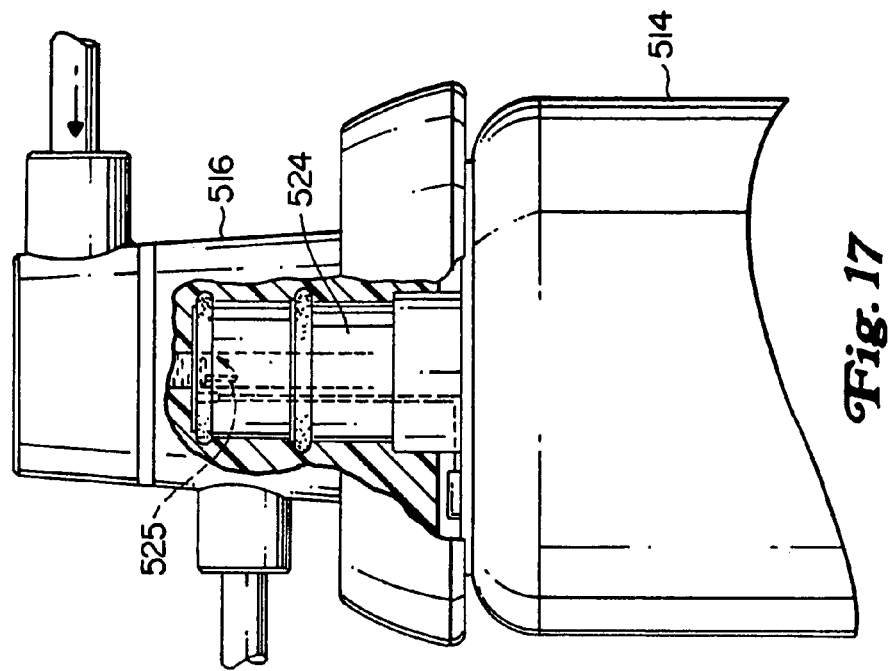
FIG. 17 is a side elevational view of a fluid treatment system constructed in accordance with a preferred embodiment of the subject invention wherein a valve member connected to a monitoring device is disposed within the flow path of the cartridge to prevent the flow of fluid therethrough when a set point has been exceeded.

As shown in FIG. 17, an embodiment of subject invention can include a cartridge 514 with an internal electronically controlled valving member 525 for selectively preventing fluid flow through the fluid flow path of the cartridge neck 524. Valve member 525 can be operatively associated with a controller in the monitoring device of the system or with a microprocessor associated with the circuit board embedded on the cartridge. The cartridge based valve member 525 is adapted and configured to move to a closed position to disable the cartridge 514 when a performance set point has been exceeded.

Figure 18:
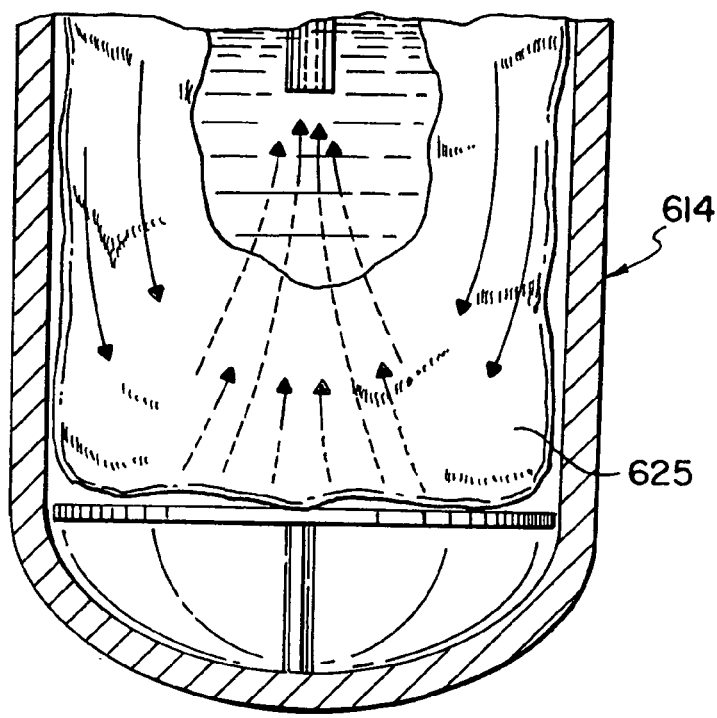
FIG. 18 is a side elevational view in partial cross-section of the lower end portion of a fluid treatment cartridge for use with the monitoring system of the subject invention in the form of an additive dispensing apparatus.

As noted briefly hereinabove, the subject invention is directed to a fluid treatment system. Therefore, the replaceable cartridge may take many forms and is not limited to any particular type of fluid treatment device. For example, as illustrated in FIG. 18, the fluid treatment cartridge can be in the form of an additive dispensing device 614 configured to dispense metered quantities of a liquid additive contained within a bladder 625 into a fluid flow passing through the cartridge. This can be used to treat potable water to improve taste, odor or color for example. An example of a suitable additive dispensing cartridge is disclosed in commonly assigned U.S. Pat. No. 5,919,360 to Contaxis, III et al. the disclosure of which is incorporated herein by reference in its entirety.

Figure 19:
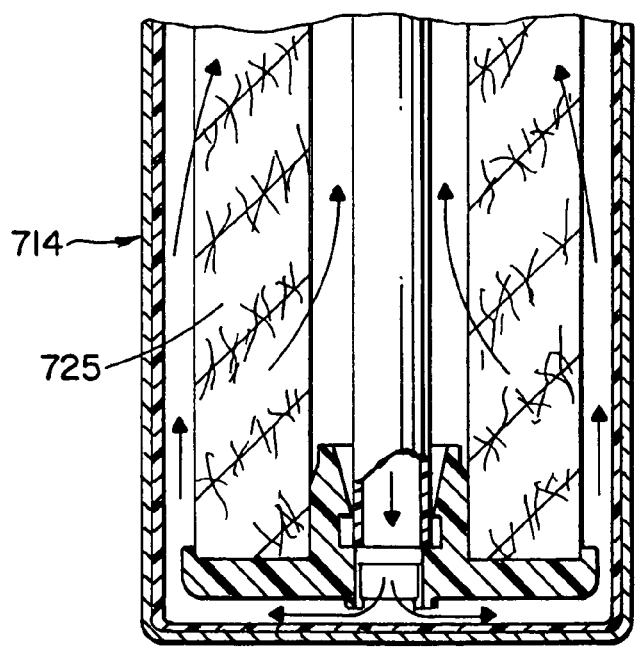
FIG. 19 is a side elevational view in partial cross-section of the lower end portion of a fluid treatment cartridge for use with the monitoring system of the subject invention in the form of a filtering device.

The replaceable cartridge of the subject invention can be in the form of a fluid filtering device 714 designed to remove impurities from potable water, as illustrated for example in FIG. 19. In such instances, the filter media 725 can be in the form of a carbon based media, cellulosic fiber media, pleated membrane media, microporous fiber media or combinations thereof. An example of suitable filter element constructed from a combination of a carbon block media and a microporous fiber media is disclosed in commonly assigned U.S. Pat. No. 6,139,739 to Hamlin et al., the disclosure of which is incorporated herein by reference in its entirety. An example of a suitable pleated filter element is disclosed in commonly assigned U.S. Pat. No. 6,315,130 to Olson, the disclosure of which is incorporated herein by reference in its entirety. It is further envisioned that the fluid treatment cartridge of the subject invention can be in the form of a coalescer configured to separate water from hydrocarbons.

Referring now to FIG. 20, there is illustrated a fluid treatment system constructed in accordance with a preferred embodiment of the subject invention and designated generally by reference numeral 800 wherein the connector head 816 communicates with a monitoring device 812 by way of wireless communication. In such an environment, the monitoring device 812 can be situated in a remote location and operatively associated with a computer terminal 825 that would enable an operator to download cartridge performance data from the connector head 816 as well as upload information to the cartridge 814 for storage on an embedded memory storage device associated therewith.

Figure 21:
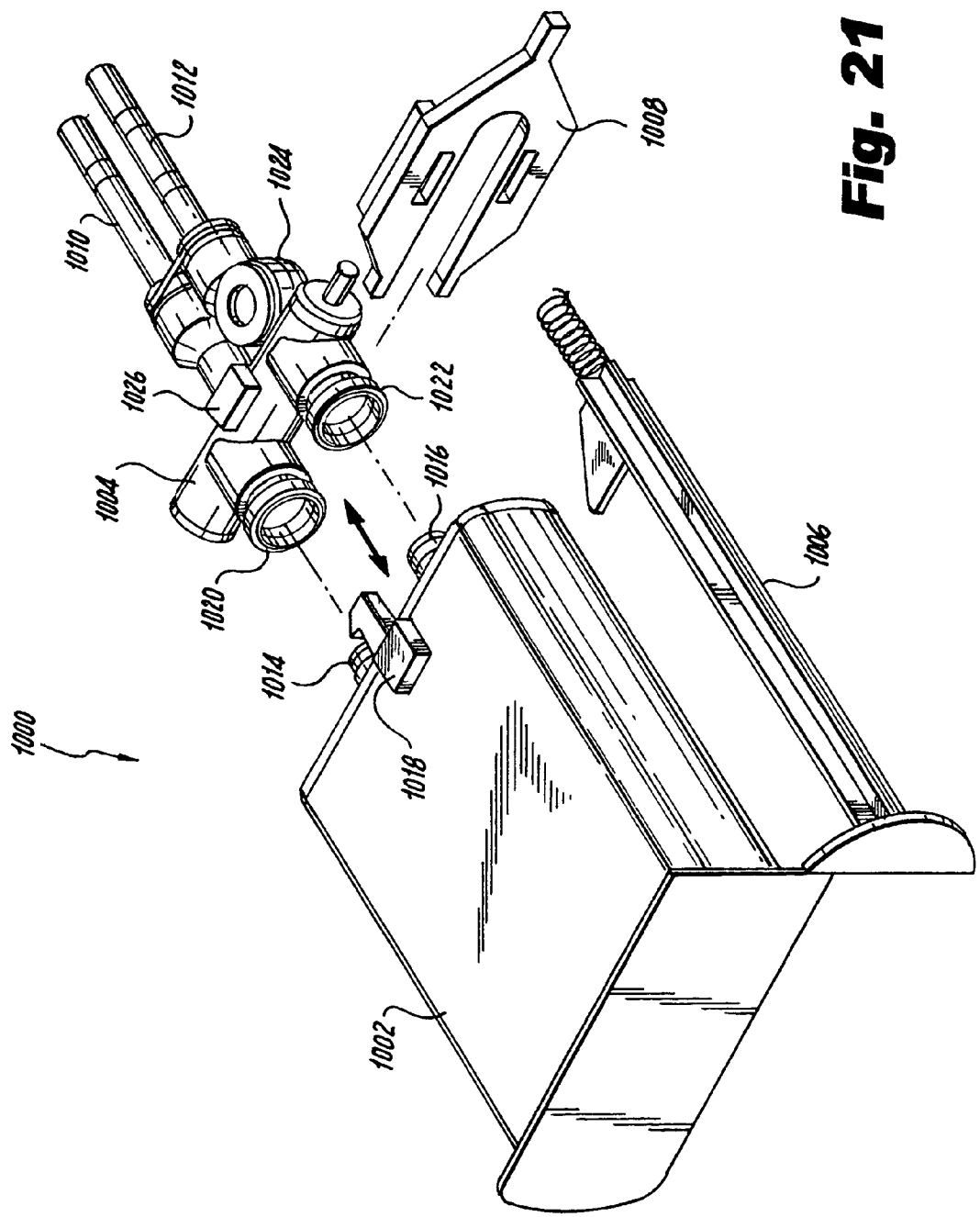
FIG. 21 is a perspective view of another preferred embodiment of the fluid filtration/treatment system constructed in accordance with the present invention and including a system for monitoring the identity and/or performance of a replaceable and/or serviceable fluid treatment cartridge.

Referring now to FIG. 21, there is illustrated another embodiment of the fluid filtration/treatment system of the subject invention 1000, which includes a system for monitoring the identity and/or performance of a replaceable and/or serviceable fluid treatment cartridge. The fluid filtration/treatment system 1000 includes a cartridge 1002 (e.g., a filter cartridge, or in other words a cartridge incorporating a filter), a distribution manifold 1004, a spring biased release member 1006, a retaining latch 1008, an external fluid supply line 1010, and an external fluid distribution line 1012. A water filtration system with a similar connection system is further depicted and described in U.S. patent application Ser. No. 10/210,890, now U.S. Pat. No. 7,067,054 which is hereby incorporated by reference to the extent not inconsistent with the present disclosure. In another preferred embodiment of the present invention, fluid filtration/treatment system 1000 can include a filtration system as described in U.S. patent application Ser. No. 10/367,083 now abandoned which is herein incorporated by reference to the extent not inconsistent with the present disclosure.

Cartridge 1002 has an inlet connection 1014 and an outlet connection 1016. Distribution manifold 1004 includes a supply connection 1020 and a distribution connection 1022 allowing for a linear connection of the distribution manifold 1004 and the cartridge 1002. Distribution manifold 1004 can include a performance sensor 1024 mounted inline with the distribution connection 1022 and external distribution line 1012. Sensor 1024 can measure suitable variables such as fluid flow rate, total flow, resistivity, chlorine concentration (of special interest when the fluid being monitored is water), fluid pH, turbidity, and the like.

On an exterior surface of cartridge 1002 is a cartridge data member 1018, which stores cartridge information. Such information can include information specific to the cartridge 1002 such as a serial number, manufacturing date, expiration date (based on date of installation, time in use, or date of manufacture), media type, and/or the type of fluid intended to be treated, and also can include information specific to a component of the cartridge, such as, in the case where the cartridge incorporates a filter, filter type, filter capacity, and the like. In particular, in the case where the cartridge incorporates multiple serviceable/replaceable components, cartridge data can further provide identifying information regarding a particular component such that it can be identified separately from all other components by the identifying indicia. Data can be stored in cartridge data member 1018 in a variety of ways, including optical, electronic, magnetic, and physical storage modes, more specific examples including bar code, EEPROM, smart card, RFID tag, and flash memory. Distribution manifold 1004 also has a data sensor 1026 located to correspond with the cartridge data member 1018 when the fluid filtration/treatment system 1000 is operatively assembled. However, the data sensor 1026 can also be located adjacent the manifold rather than on the manifold. An example of the data stored in cartridge data member 1018 is provided in Table 1 below.

TABLE 1

Example of data stored in a cartridge data member.

| Parameter | Value |
|---|---|
| Date of manufacture | 3.21.2004 |
| Throughput capacity (Gal.) | 100000.0 |
| Shelf life (Days) | 365.0 |
| Service life (Days) | 150.0 |

Figure 22:
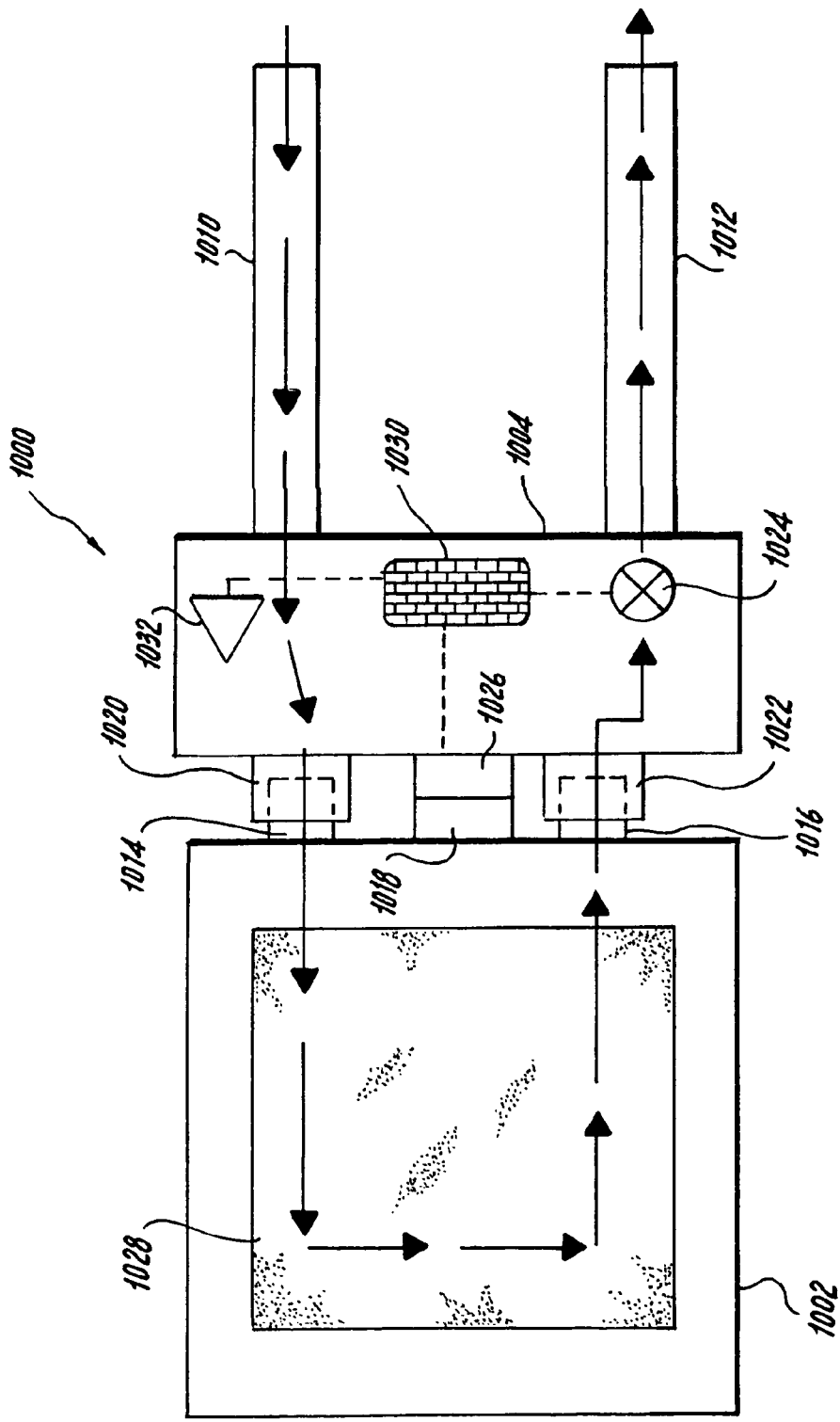
FIG. 22 is a schematic representation of the operation of a fluid filtration/treatment system constructed in accordance with yet another preferred embodiment of the present invention.

A schematic representation of the operation of the fluid filtration/treatment system 1000 is shown in FIG. 22. Generally, fluid (in many cases, water) flows from an external source through the external supply line 1010 and into the distribution manifold 1004. The fluid is directed through the supply connection 1020 and into the cartridge 1002 through the inlet connection 1014. Within the cartridge 1002, the fluid is passed through a selected media 1028 to treat the fluid, the choice of media depending on the cartridge function. For example, if the cartridge 1002 is a filter cartridge, the fluid is filtered through a filter media. Treated fluid is directed out of the cartridge 1002 by outlet connection 1016 wherein the treated fluid enters the distribution manifold 1004 through the distribution connection 1022. The treated fluid flows through the distribution manifold 1004 where the treated fluid comes in contact with the performance sensor 1024. The treated fluid is sent to points of use through the external distribution line 1012.

As shown in FIG. 22, distribution manifold 1004 can include a logic device/controller 1030 and an alarm 1032. The logic device 1030 can be in electrical communication with the manifold data sensor 1026, the sensor 1024, and the alarm 1032. Logic device 1030 can include an electronic device such as a switch, relay, PLC, or microprocessor. Logic device 1030 can also include a transmission means, such as an optical, electrical, magnetic, or electromagnetic transmitter capable of communicating with an outside source such as a troubleshooting device, the Internet, and the like.

During attachment of the cartridge 1002 to the distribution manifold 1004, the cartridge data member 1018 and the manifold data sensor 1026 are directed into communication, thereby allowing the manifold data sensor 1026 to communicate with and read cartridge information from the cartridge data member 1018. The communications between the cartridge data member 1018 and the manifold data sensor 1026 are enabled, for example, through a rotatable or linear communication mode requiring permanent or temporary contact, through a line-of-sight communication mode such as infrared or bar coding, or through relative proximity to magnetic or electromagnetic (e.g., radio frequency or RF) fields. Once in communication, manifold data sensor 1026 can transmit information to and receive information from cartridge data member 1018 via an appropriate physical, optical, magnetic, or electromagnetic (e.g., RF) means, in either an analog or digital format. The information received by the manifold data sensor 1026 is then communicated to the logic device 1030.

Within logic device 1030, the information from cartridge data member 1018 as well as performance sensor 1024 is compared against either performance criteria uploaded from the cartridge data member 1018 or predetermined logic criteria. If the information from cartridge data member 1018 exceeds, falls below or fails to match the criteria, logic device 1030 can send a suitable electronic signal to the audio and/or visual alarm 1032 such that a user can be warned of the issue. Alarm 1032 can provide a pre-failure warning when a predetermined threshold has been reached, for example when the total flow limit of the cartridge 1002 is being approached. In some instances, logic device 1030 can simultaneously cause an inlet valve, for example a solenoid valve, to close until the issue has been resolved. Once the issue has been resolved to the satisfaction of the logic device 1030, the logic device 1030 can reset the fluid filtration/treatment system 1000, for example by instructing an inlet valve to open such that fluid filtration/treatment system 1000 resumes operation, operation being halted until then. In one embodiment, the solenoid valve acts as a diverter, such that fluid flows through cartridge 1002 when logic device 1030 determines that cartridge 1002 is operating as intended, but causes fluid to bypass cartridge 1002 when logic device 1030 determines that cartridge 1002 is not operating properly. Preferably, when fluid is caused to bypass the cartridge, the resulting fluid flow rate is significantly reduced (thereby initiating a "drip mode"). Such a "bypass mode" is only appropriate for certain applications in which unfiltered fluid can be used safely. In another embodiment, logic device 1030 can prevent a consumer from removing a spent cartridge and simply reattaching the same spent cartridge such that fluid filtration/treatment system 1000 will resume operation, by using specific cartridge information to determine that the replacement cartridge is in fact not a new cartridge. Thus, cartridge specific information can be used to prevent fooling the system into a reset mode. This information can be similarly used if the system has a switch or the like to reset the system since the system can override the switch to prevent risk to the consumer if the cartridge has not be replaced with a suitable cartridge. In still another embodiment, logic device 1030 allows a partially used cartridge to be attached to be used for any remaining useful life, thus allowing partially used cartridges, for example, to be stored by a user for temporary use while obtaining a new cartridge. In yet another embodiment, valves used to inhibit fluid flow through a cartridge are located on the outlet portion of the cartridge.

Figure 23:
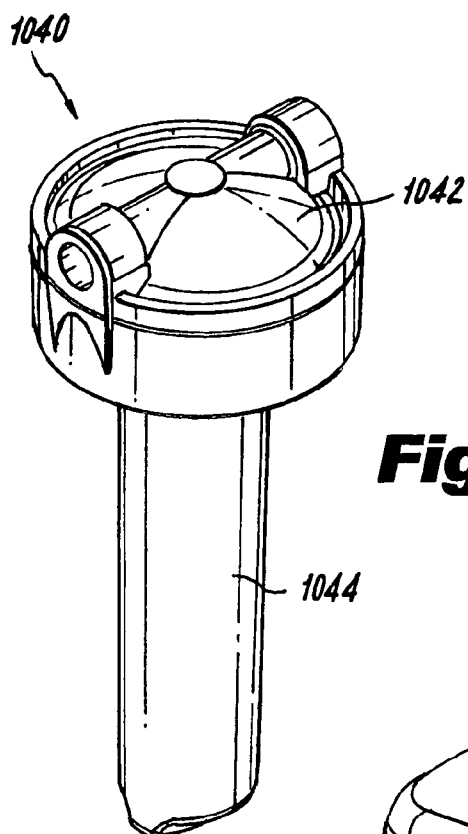
FIG. 23 is a perspective view of another preferred embodiment of the fluid filtration/treatment system constructed in accordance with the present invention, the system utilizing a rotational connection between the cartridge and the distribution manifold.
Figure 24:
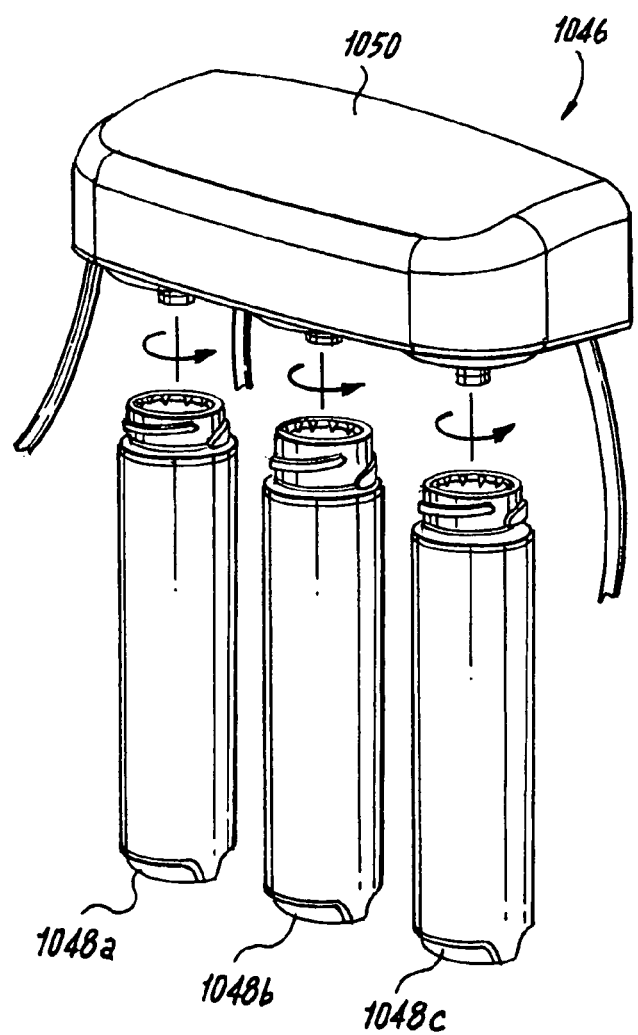
FIG. 24 is a perspective view of another preferred embodiment of the fluid filtration/treatment system constructed in accordance with the present invention, the system utilizing a plurality of treatment cartridges rotationally connected to the distribution manifold.

Further preferred embodiments of the present invention, utilizing rotationally connected water filtration systems, are shown in FIGS. 23 and 24. Referring first to FIG. 23, fluid filtration/treatment system 1040 includes a distribution manifold 1042 and a cartridge 1044. The manifold 1042 and cartridge 1044 include a rotatable interconnection mechanism such as, for example, the rotatable interconnection mechanisms disclosed in U.S. patent application Ser. No. 09/618,686 (now U.S. Pat. No. 6,953,526), Ser. No. 09/918,316 (now U.S. Pat. No. 6,632,355), Ser. No. 10/196,340 (now abandoned), Ser. No. 10/202,290 (now abandoned), and Ser. No. 10/406,637 (U.S. Pat. No. 7,147,772), each of which is herein incorporated by reference to the extent not inconsistent with the present disclosure.

Referring now to FIG. 24, a fluid filtration/treatment system 1046 can include a plurality of cartridges, for example, in the case where fluid treatment/filtration system includes a plurality of cartridge filters, a pretreatment filter 1048a, a primary filter 1048b, and a post-treatment filter 1048c, each with a specifically selected filter media that can be rotationally-attached to a multi-filter distribution manifold 1050 such that an external water source is serially filtered to achieve a desired fluid quality. Regardless of manifold type, the various cartridges (cartridge 1044, pretreatment filter 1048a, primary filter 1048b, and post-treatment filter 1048c) can include a cartridge data member (similar to cartridge data member 1018) that comes into proximity with a data sensor (similar to data sensor 1026 of FIG. 21) through rotational interconnection with distribution manifold 1042 or multi-filter distribution manifold 1050. Again, distribution manifold 1042 and multi-filter distribution manifold 1050 can both include a logic processor (such as logic device 1030 of FIG. 21) and a flow sensor (such as performance sensor 1024 of FIG. 21) to provide system specific information relative to indicating possible system alarm situations as previously described. Preferably, when multiple cartridges are utilized in the fluid filtration/treatment system, cartridge data members include information regarding allowable installation position of a cartridge in a multi-filter distribution manifold or allowable relative positioning of the cartridges that is read by a data sensor on the manifold. This is useful in cases where serial treatment requires a specific order of treatment steps for effectiveness. An example of the data stored in cartridge data member for cartridges to be used in fluid filtration/treatment systems utilizing multiple cartridges is provided in Table 2 below.

TABLE 2

Example of data stored in a cartridge data member.

| Parameter | Value |
| --- | --- |
| Date of manufacture | 3.21.2004 |
| Throughput capacity (Gal.) | 100000.0 |
| Shelf life (Days) | 365.0 |
| Service life (Days) | 150.0 |
| Installation position | 2 |

Figure 25:
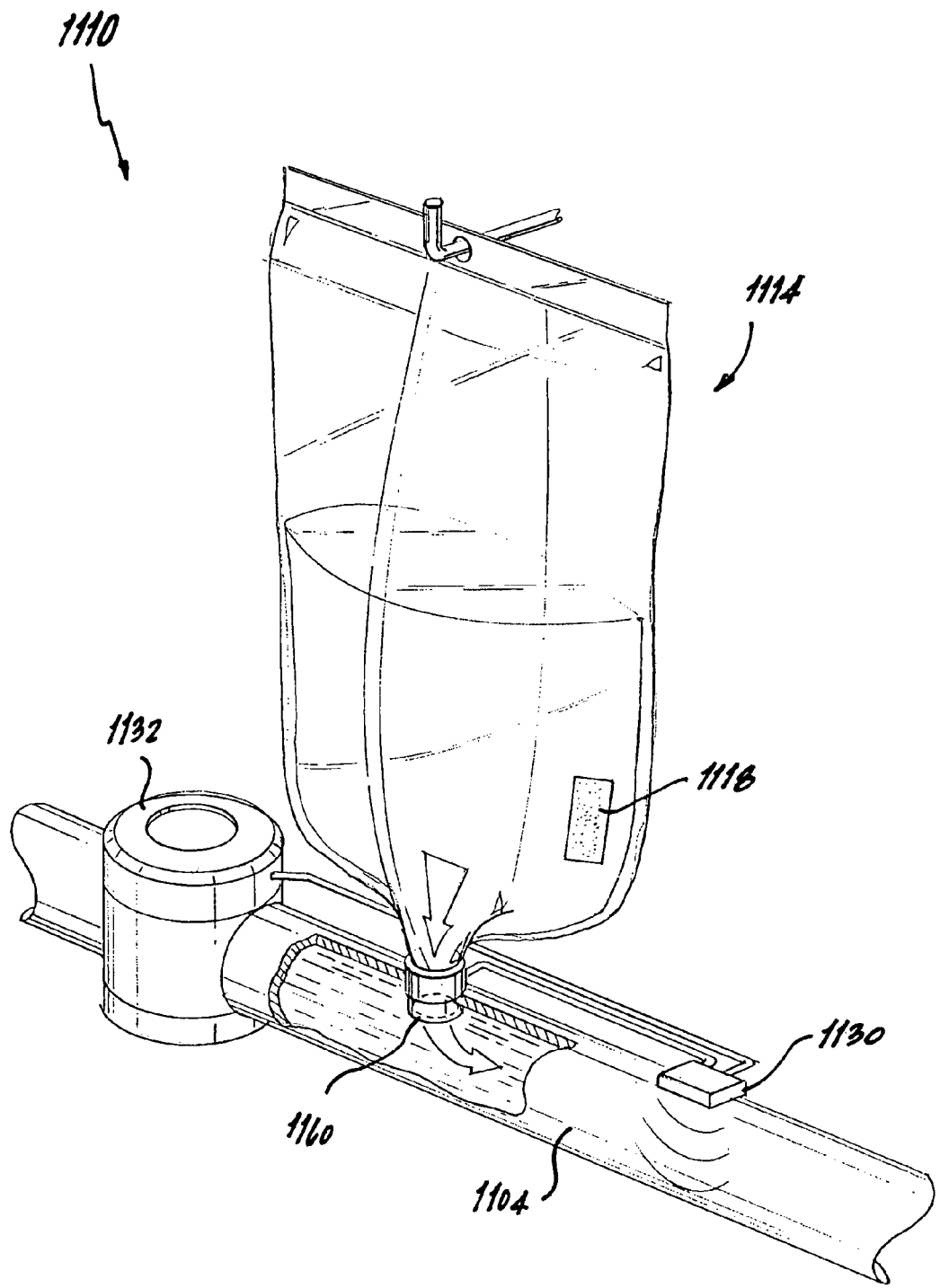
FIG. 25 is a perspective view of another preferred embodiment of the fluid treatment system constructed in accordance with the present invention, the system including a container of additive that is released into a conduit.

Referring now to FIG. 25, the fluid treatment system 1110 of the present invention may also operate without utilizing a cartridge through which fluid flows. In the preferred embodiment of FIG. 25, fluid to be treated flows through a conduit 1104. A sensor 1132 monitors a characteristic (e.g., velocity) of the fluid flowing through the conduit 1104 and communicates data to a logic device 1130. Also secured to the conduit 1104 is a treatment device 1114 in fluid communication with the conduit 1104; in this case, the treatment device is a bag containing an additive to be dispensed into the fluid being treated. The treatment device 1114 includes an RFID tag 1118 including data specific to the treatment device (e.g., data identifying the contents of the device); this data is also communicated to the logic device 1130. The logic device 1130 evaluates the data communicated from the sensor 1132 and that from the RFID tag 1118, and in response sends a signal to a solenoid valve 1160 that separates the treatment device 1114 and the conduit 1104, instructing the valve 1160 to open or close and thereby selectively controlling the release of additive into the fluid of the conduit 1104.

For example, the fluid treatment system 1110 of FIG. 25 may be an automated detergent dispensing system for a clothes washing machine. In such case, conduit 1104 connects with a water supply for the washing machine (not shown). The treatment device 1114 contains detergent to be added to the water. The RFID tag 1118 on the treatment device 1114 would indicate, for example, the amount of detergent to be added for each gallon of water and the viscosity of the detergent. The conduit 1104 would include a sensor 1132 to monitor water flow rate into the washing machine. These data are communicated to the logic device 1130 for evaluation. In response to this evaluation, the logic device 1130 instructs the solenoid valve 1160 to open intermittently, the frequency of opening being appropriate to achieve the desired ratio of detergent to water.

Although an exemplary embodiment of the fluid treatment system of FIG. 25 has been described in connection with the addition of detergent to a washing machine, other uses are also possible. For example, in another preferred embodiment, the treatment system could be used to add different substances to a wash at different times, as a function, for example, of water temperature. In another preferred embodiment, the fluid treatment system may be used to monitor a saline drip in a hospital and add appropriate medications.

In an alternative preferred embodiment of the above-described fluid treatment system, a fluid treatment device includes a treating material to which fluid being treated is selectively exposed. In such case, the treating material is not released into the fluid being treated, but simply contacts the fluid in order to provide treatment. For example, the treating device could include a surface to which fluid being treated is selectively exposed via the operation of a retracting valve. Such a surface, for example, could be composed of a material (e.g., platinum) that promotes heterogeneous catalysis of molecular products in the fluid being treated. Alternatively, treating material could be chosen such that particles suspended in the fluid preferentially adsorb onto the surface (e.g., by choosing a material with a large interfacial energy).

Although the disclosed fluid treatment system has been described with respect to preferred embodiments, it is apparent that modifications and changes can be made thereto without departing from the spirit and scope of the invention as defined by the appended claims.

What is claimed is:

1. A fluid treatment system comprising:
   a) a fluid treatment cartridge for treating fluid passing therethrough, the cartridge having an inlet through which untreated fluid enters the cartridge and an outlet from which treated fluid exits the cartridge, the cartridge having a RFID tag for storing data;
   b) a connection manifold configured to detachably support the fluid treatment cartridge, the connection manifold having an inlet flow path for directing untreated fluid to the inlet of the cartridge and an outlet flow path for directing treated fluid from the outlet of the cartridge, and a data sensor for reading data stored on the RFID tag;
   c) means for evaluating the data stored on the RFID tag and read by the data sensor; and
   d) means for deterring fluid treatment system use based upon the evaluation of the data stored on the RFID tag and read by the data sensor;
   wherein the means for deterring fluid treatment system use includes a structure operatively associated with the means for evaluating the data stored on the RFID tag and adapted for movement into a blocking position in response to a signal from the data evaluation means, such that the structure can selectively prevent mounting of the cartridge in the connection manifold.

2. A fluid treatment system as recited in claim 1, wherein the means for evaluating the data stored on the RFID tag and read by the data sensor includes a processor and a memory in communication with the data sensor, the memory containing predetermined parameter ranges for comparison to the data stored on the RFID tag and the processor comparing the data received from the RFID tag via the data sensor to the predetermined parameter ranges stored in the memory.

3. A fluid treatment system as recited in claim 1, further comprising a fluid characteristic sensor, and wherein the means for evaluating the data stored on the RFID tag and read by the data sensor includes a processor in communication with the fluid characteristic sensor and the data sensor, the processor comparing data received from the fluid characteristic sensor to the data received from RFID tag via the data sensor.

4. A fluid treatment system as recited in claim 3, wherein the fluid characteristic sensor is selected from the group consisting of a pressure transducer, a flow meter, a pH sensor, a resistivity sensor, a chemical analysis sensor, a fluid pH meter, a turbidity sensor, a timer, and a thermocouple.

5. A fluid treatment system as recited in claim 1, wherein the means for deterring fluid treatment system use includes means for preventing the flow of fluid through the fluid treatment cartridge.

6. A fluid treatment system as recited in claim 5, wherein the means for preventing the flow of fluid through the fluid treatment cartridge is operatively associated with the connection manifold.

7. A fluid treatment system as recited in claim 5, wherein the means for preventing the flow of fluid through the fluid treatment cartridge is operatively associated with the fluid treatment cartridge.

8. A fluid treatment system as recited in claim 1, wherein the means for deterring fluid treatment system use includes an alarm operatively associated with the means for evaluating the data stored on the RFID tag and activated in response to a signal from the data evaluation means.

9. A fluid treatment system as recited in claim 1, wherein the data stored on the RFID tag includes system performance data.

10. A fluid treatment system as recited in claim 9, wherein the subject of the performance data is selected from the group consisting of maximum allowable time in use data, expiration date data, fluid treatment capacity limit data, upper and lower acceptable limits for pressure drop across the cartridge data, upper and lower acceptable limits for fluid flow rate through the cartridge data, and upper and lower acceptable limits for turbidity.

11. A fluid treatment system as recited in claim 1, wherein the data stored on the RFID tag includes cartridge identification data.

12. A fluid treatment system as recited in claim 11, wherein the subject of the cartridge identification data is selected from the group consisting of fluid treatment cartridge identification data, manufacturer identification data, and manufacturing date data.

13. A fluid treatment system as recited in claim 1, wherein the fluid treatment cartridge includes means for dispensing an additive into fluid flowing through the cartridge.

14. A fluid treatment system as recited in claim 1, wherein the means for evaluating the data stored on the RFID tag and read by the sensor is incorporated into the connection manifold.

15. A fluid treatment system comprising:
   a) a detachable fluid treatment cartridge for treating fluid passing therethrough, the cartridge having an inlet through which untreated fluid enters the cartridge, an outlet from which treated fluid exits the cartridge, and an RFID tag for storing data;
   b) a connection manifold configured to detachably support the fluid treatment cartridge, the connection manifold having an inlet flow path for directing untreated fluid to the inlet of the cartridge and an outlet flow path for directing treated fluid from the outlet of the cartridge;
   c) a data sensor for reading data stored on the RFID tag;
   d) means for evaluating the data stored on the RFID tag and read by the sensor; and
   e) means for inhibiting fluid treatment system use based upon the evaluation of such data, and
   wherein the data sensor reads the data stored on the RFID tag when the fluid treatment cartridge is brought into proximity with the data sensor such that the data evaluation means can evaluate the data stored on the RFID tag before the cartridge is mounted onto the connection manifold;
   wherein the means for inhibiting fluid treatment system use includes a structure operatively associated with the means for evaluating the data stored on the RFID tag and adapted for movement into a blocking position in response to a signal from the data evaluation means, such that the structure can selectively prevent mounting of the cartridge in the connection manifold.

16. A fluid treatment system as recited in claim 15, wherein the data stored on the RFID tag includes cartridge identification data.

17. A fluid treatment system as recited in claim 16, wherein the subject of the cartridge identification data is selected from the group consisting of fluid treatment cartridge identification data, manufacturer identification data, and manufacturing date data.

18. A fluid treatment system as recited in claim 15, wherein:
   the data stored on the RFID tag includes cartridge identification data,
   the means for evaluating the data stored on the RFID tag and read by the data sensor includes a processor and a memory in communication with the data sensor, the memory containing authorized cartridge identification information, and
   the processor compares the cartridge identification data received from the RFID tag via the data sensor to the authorized cartridge identification information stored in the memory and sends a signal to cause the blocking structure to move into a blocking position when the RFID tag data is inconsistent with the data stored in the memory.

19. A fluid treatment system as recited in claim 15, wherein the means for evaluating the data stored on the RFID tag and read by the sensor is incorporated into the connection manifold.

* * * * *

UNITED STATES PATENT AND TRADEMARK OFFICE
CERTIFICATE OF CORRECTION

PATENT NO.       : 7,638,042 B2
APPLICATION NO.  : 11/267670
DATED            : December 29, 2009
INVENTOR(S)      : Astle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this

Ninth Day of November, 2010

David J. Kappos
*Director of the United States Patent and Trademark Office*